United States Patent
Schöb

(10) Patent No.: US 10,920,781 B2
(45) Date of Patent: Feb. 16, 2021

(54) ROTARY PUMP

(71) Applicant: Levitronix GmbH, Zurich (CH)

(72) Inventor: Reto Schöb, Gossau (CH)

(73) Assignee: Levitronix GmbH, Zurich (CH)

( * ) Notice: Subject to any disclaimer, the term of this patent is extended or adjusted under 35 U.S.C. 154(b) by 212 days.

(21) Appl. No.: 15/802,946

(22) Filed: Nov. 3, 2017

(65) Prior Publication Data

US 2018/0051699 A1 Feb. 22, 2018

Related U.S. Application Data

(63) Continuation of application No. 13/820,491, filed as application No. PCT/EP2010/062789 on Sep. 1, 2010, now Pat. No. 9,835,158.

(51) Int. Cl.
*F04D 1/00* (2006.01)
*F04D 13/06* (2006.01)
(Continued)

(52) U.S. Cl.
CPC ............. *F04D 1/006* (2013.01); *F04D 13/06* (2013.01); *F04D 13/064* (2013.01);
(Continued)

(58) Field of Classification Search
CPC .... F04B 29/048; F04B 13/0666; F04B 13/06; F04B 13/064; F04B 13/0633; F04B 1/006;
(Continued)

(56) References Cited

U.S. PATENT DOCUMENTS 4,983,870 A * 1/1991 McSparran ......... F16C 32/0459
310/216.021
4,990,809 A * 2/1991 Artus ................... H02K 19/103
310/192

(Continued)

FOREIGN PATENT DOCUMENTS

EP 0 900 572 A1 3/1999
WO 02/07289 A2 1/2002
(Continued)

OTHER PUBLICATIONS

International Search Report dated May 23, 2011 for PCT Patent Application No. PCT/EP2010/062789, 2 pages.

*Primary Examiner* — Christopher S Bobish
(74) *Attorney, Agent, or Firm* — Kilpatrick Townsend & Stockton LLP

(57) ABSTRACT

Disclosed is a rotary pump including a magnetic rotor arranged in a pump housing and having a magnetic rotor plane, which rotor is operatively connected to a drive for conveying a fluid. The drive is a bearingless motor having a stator configured as a bearing stator and drive stator and having a magnetic stator plane, wherein the stator bears a drive coil and a bearing coil lying in the stator plane and/or a drive bearing coil. The rotor is magnetically contactlessly journalled within the stator, wherein an axial height (H) of the rotor is smaller than or equal to half a diameter (D) of the rotor so that the rotor is passively magnetically stabilized by reluctance forces with respect to the magnetic stator plane both against axial displacement and against a tilt from an equilibrium position.

9 Claims, 23 Drawing Sheets

(51) Int. Cl.
*F04D 29/048* (2006.01)
*H02K 1/06* (2006.01)

(52) U.S. Cl.
CPC ..... *F04D 13/0633* (2013.01); *F04D 13/0646* (2013.01); *F04D 29/048* (2013.01); *H02K 1/06* (2013.01)

(58) Field of Classification Search
CPC ..... H02K 1/06; F04D 29/048; F04D 13/0646; F04D 13/06; F04D 13/064; F04D 13/0633; F04D 1/006
USPC ........ 310/49.29, 216.021; 417/423.14, 423.7
See application file for complete search history.

(56) References Cited

U.S. PATENT DOCUMENTS

| | | | | |
|---|---|---|---|---|
| 5,158,440 A * | 10/1992 | Cooper | F04D 13/0646 | 417/355 |
| 5,350,283 A * | 9/1994 | Nakazeki | F04D 29/048 | 417/423.7 |
| 5,385,581 A * | 1/1995 | Bramm | F04D 13/06 | 417/356 |
| 5,685,700 A * | 11/1997 | Izraelev | F04D 29/2211 | 417/423.7 |
| 5,798,454 A * | 8/1998 | Nakazeki | A61M 1/101 | 73/54.23 |
| 5,924,848 A * | 7/1999 | Izraelev | F04D 13/0646 | 417/420 |
| 5,939,813 A * | 8/1999 | Schob | F04D 13/0673 | 310/156.25 |
| 6,053,705 A * | 4/2000 | Schob | F16C 32/0497 | 417/53 |
| 6,100,618 A * | 8/2000 | Schoeb | F04D 1/006 | 310/90 |
| 6,155,969 A * | 12/2000 | Schima | F04D 29/0465 | 600/16 |
| 6,171,078 B1 * | 1/2001 | Schob | F04D 13/0646 | 417/420 |
| 6,181,040 B1 * | 1/2001 | Schob | F16C 32/0493 | 310/103 |
| 6,220,832 B1 * | 4/2001 | Schob | F04D 1/006 | 417/423.5 |
| 6,264,635 B1 * | 7/2001 | Wampler | F04D 29/041 | 417/423.1 |
| 6,302,661 B1 * | 10/2001 | Khanwilkar | F04D 13/0646 | 415/900 |
| 6,547,539 B2 * | 4/2003 | Izraelev | F04D 1/006 | 415/900 |
| 6,595,762 B2 * | 7/2003 | Khanwilkar | F04D 29/048 | 415/900 |
| 6,720,695 B2 * | 4/2004 | Coenen | D01H 4/12 | 310/90.5 |
| 6,879,074 B2 * | 4/2005 | Amrhein | F16C 32/0493 | 310/90.5 |
| 7,112,903 B1 * | 9/2006 | Schob | F16C 32/0465 | 310/90.5 |
| 7,145,308 B1 * | 12/2006 | Chase | H02K 7/088 | 318/400.41 |
| 7,699,588 B2 * | 4/2010 | Mendler | F04D 29/048 | 417/423.1 |
| 7,905,712 B2 * | 3/2011 | Huang | F04D 29/586 | 310/216.023 |
| 8,672,611 B2 * | 3/2014 | LaRose | F04D 13/0666 | 415/104 |
| 8,754,562 B2 * | 6/2014 | Platon | H01F 27/23 | 310/215 |
| 8,920,133 B2 * | 12/2014 | Bosua | F04C 29/124 | 417/307 |
| 2001/0013733 A1 * | 8/2001 | Schob | F16C 32/0463 | 310/90.5 |
| 2003/0103852 A1 * | 6/2003 | Schob | B24B 37/04 | 417/410.1 |
| 2005/0084399 A1 * | 4/2005 | Wampler | A61M 1/101 | 417/423.12 |
| 2007/0114859 A1 * | 5/2007 | Chen | F04D 25/0606 | 310/63 |
| 2007/0280841 A1 * | 12/2007 | LaRose | A61M 1/101 | 417/423.12 |
| 2010/0172775 A1 * | 7/2010 | Onuma | F04D 13/06 | 417/423.7 |

FOREIGN PATENT DOCUMENTS

| | | | |
|---|---|---|---|
| WO | 02/07289 A3 | 1/2002 | |
| WO | 2005/019654 A1 | 3/2005 | |
| WO | WO-2010012071 A1 * | 2/2010 | ......... H01F 27/324 |

* cited by examiner

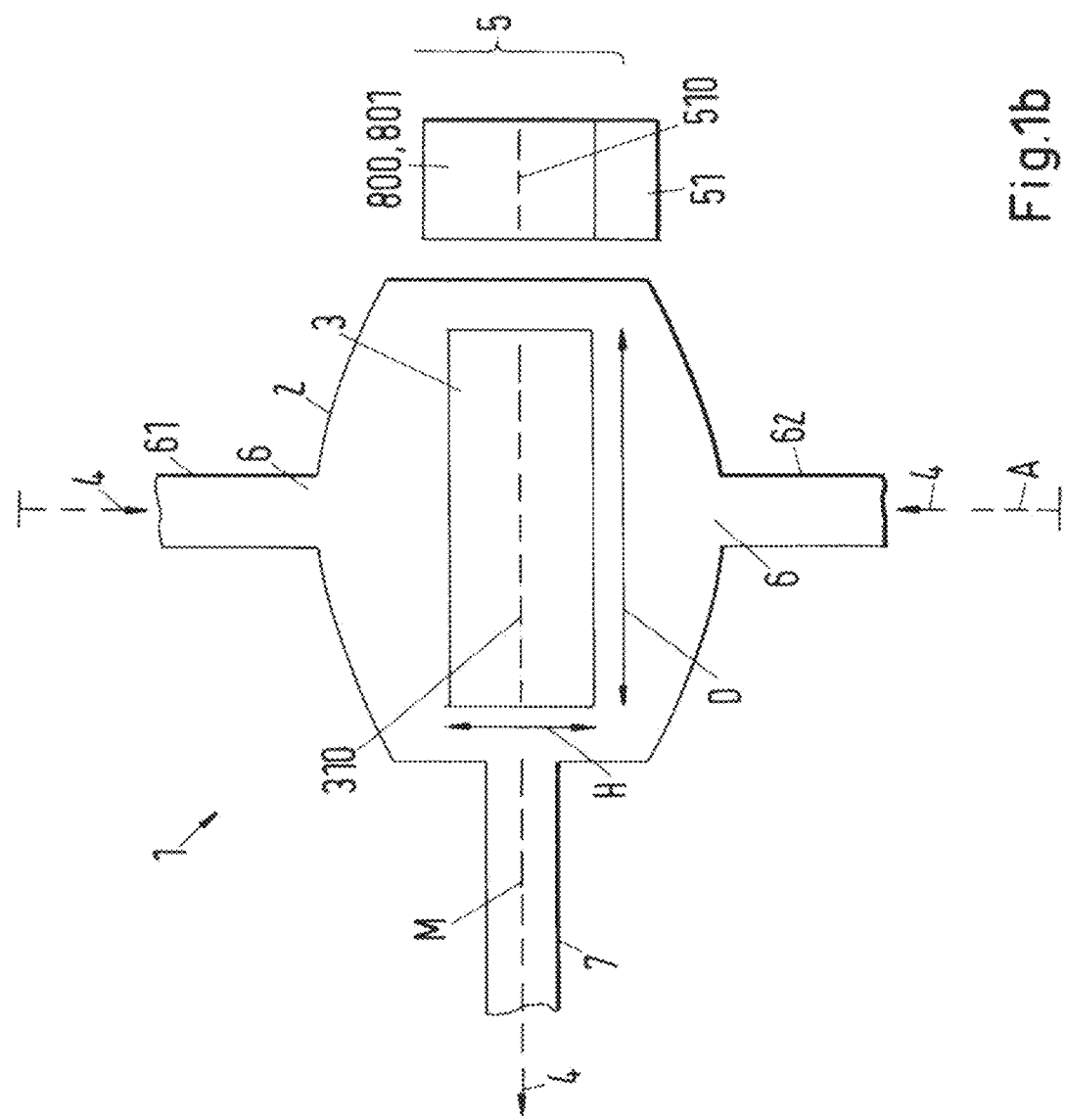

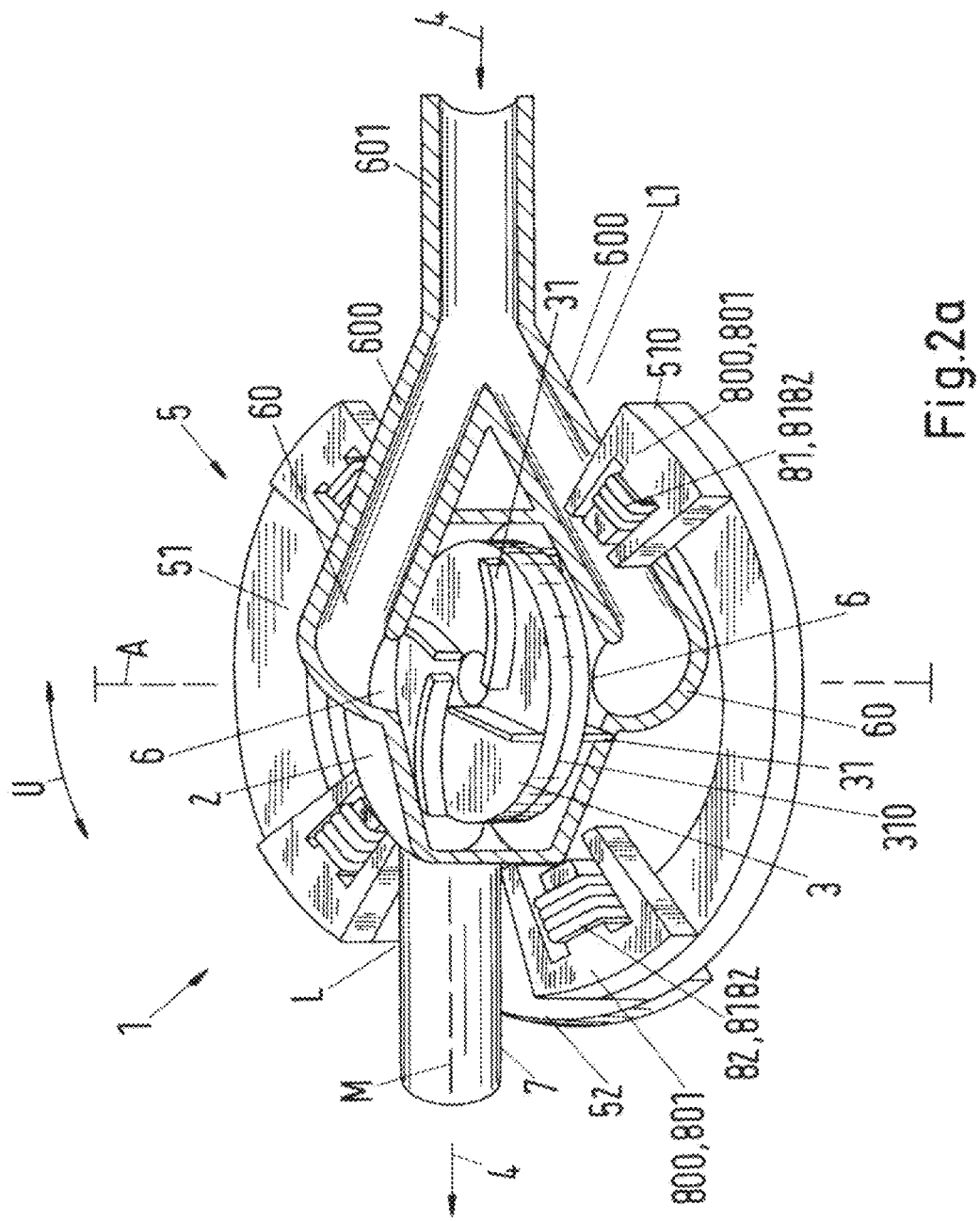

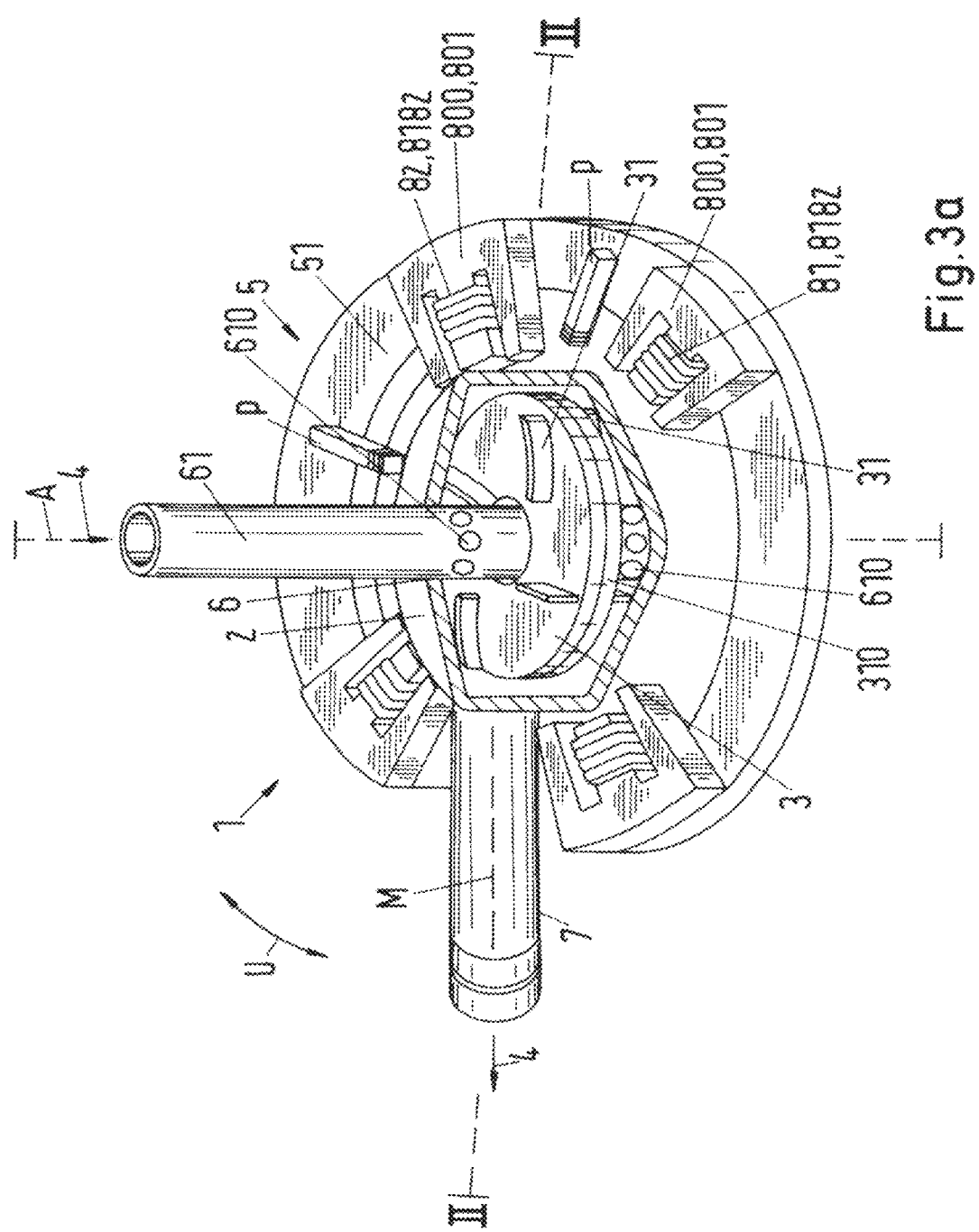

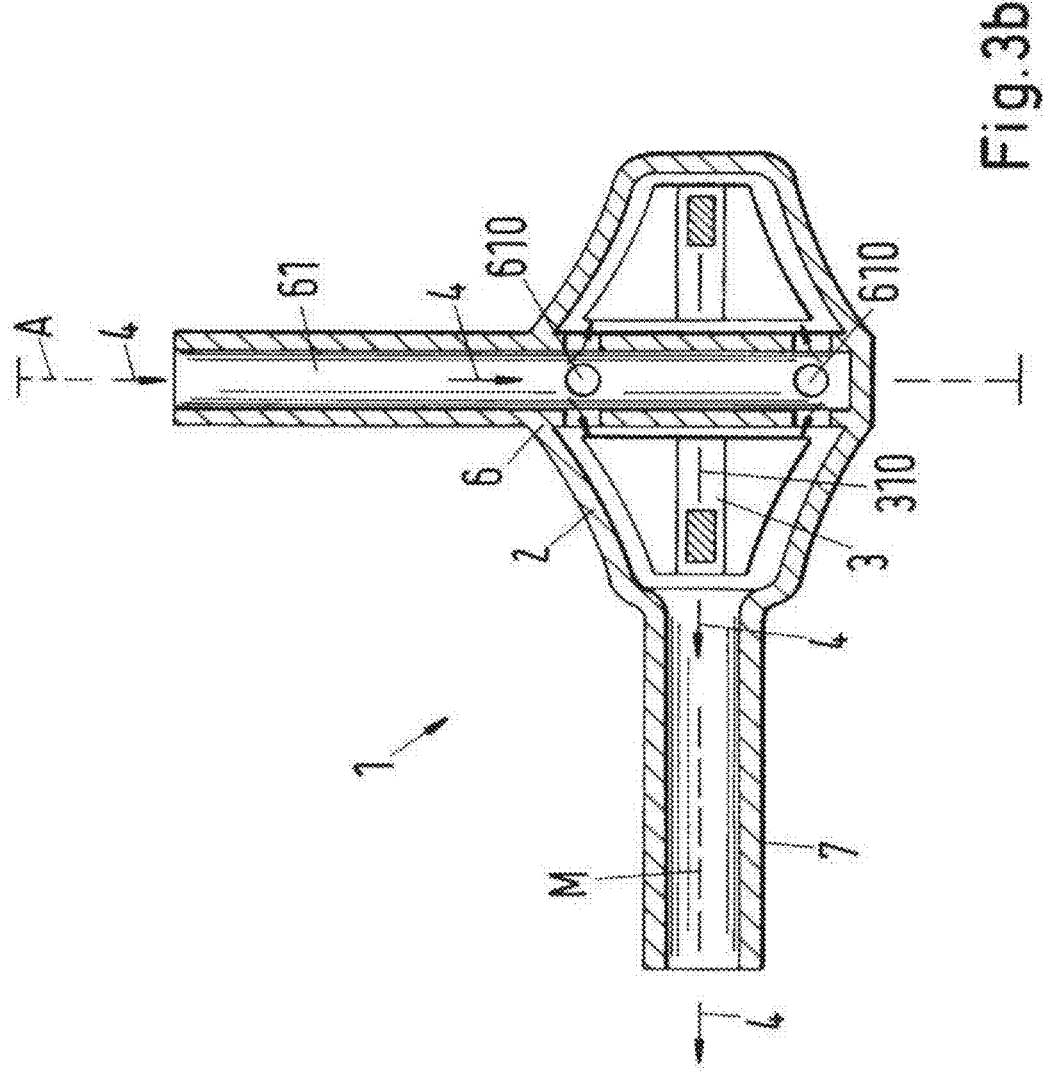

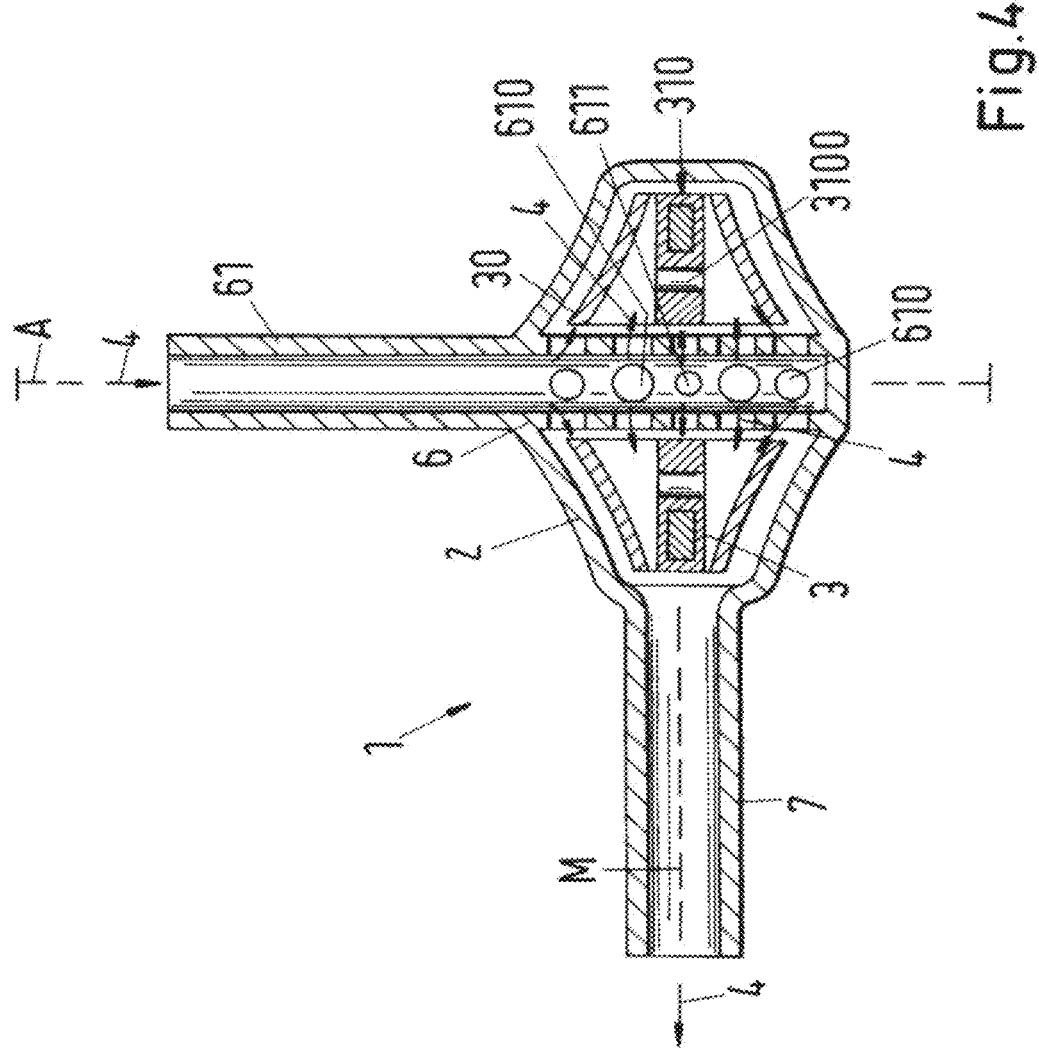

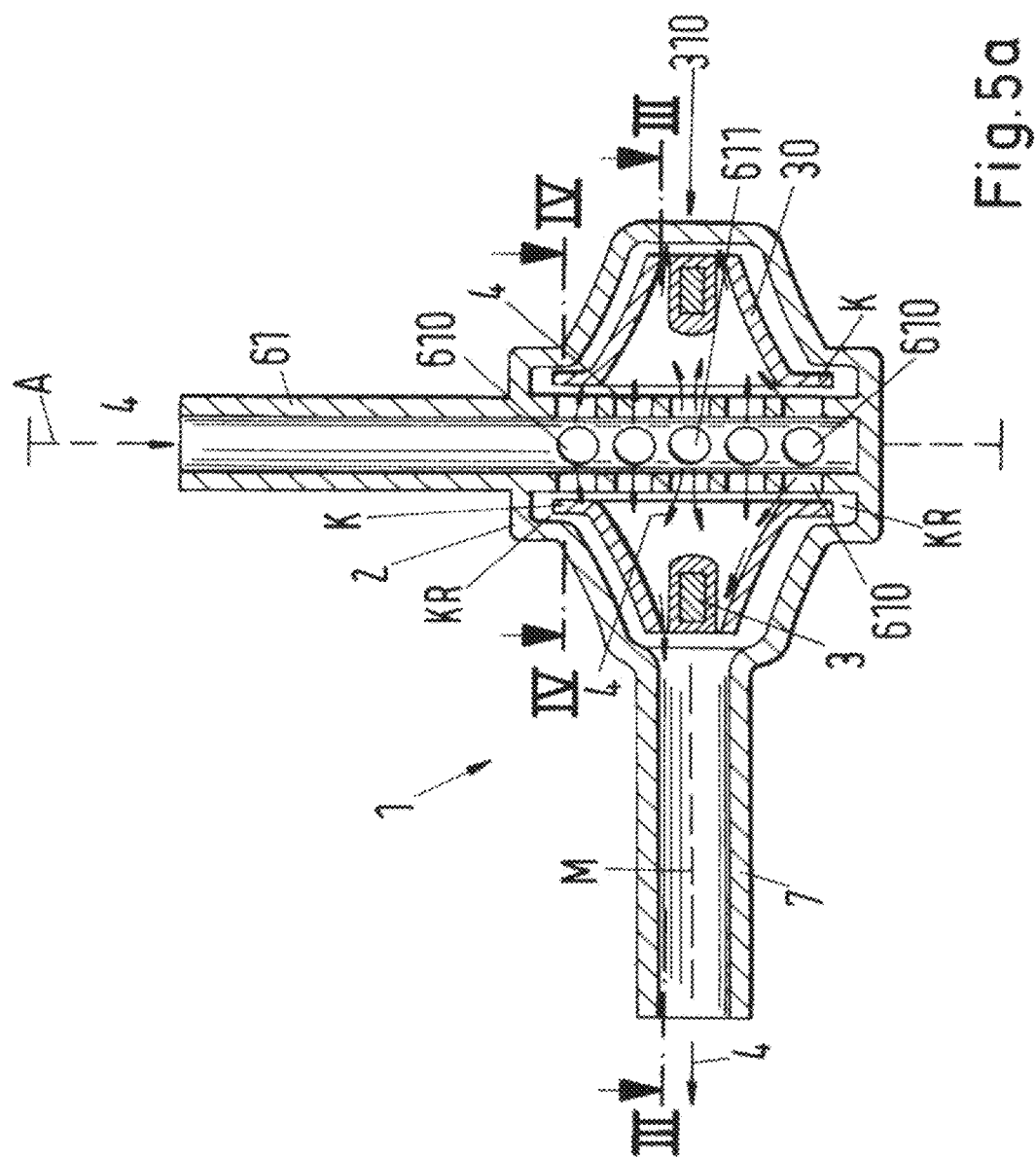

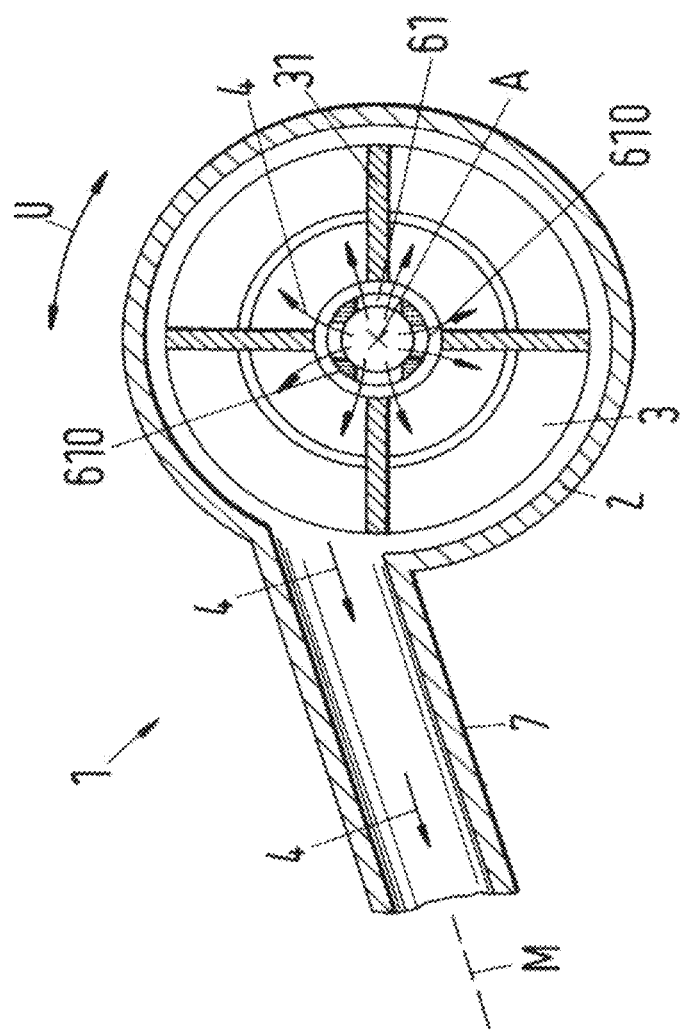

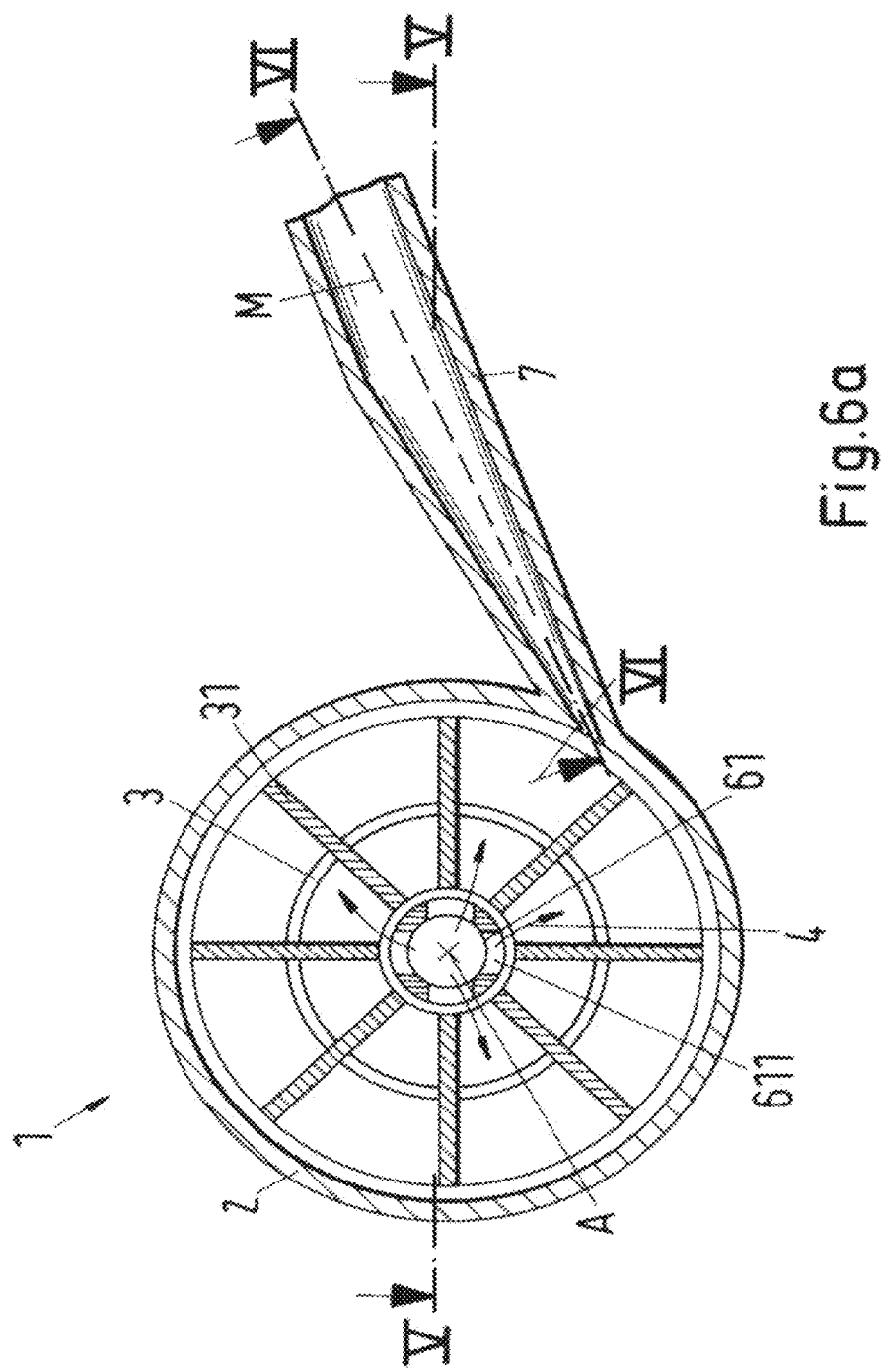

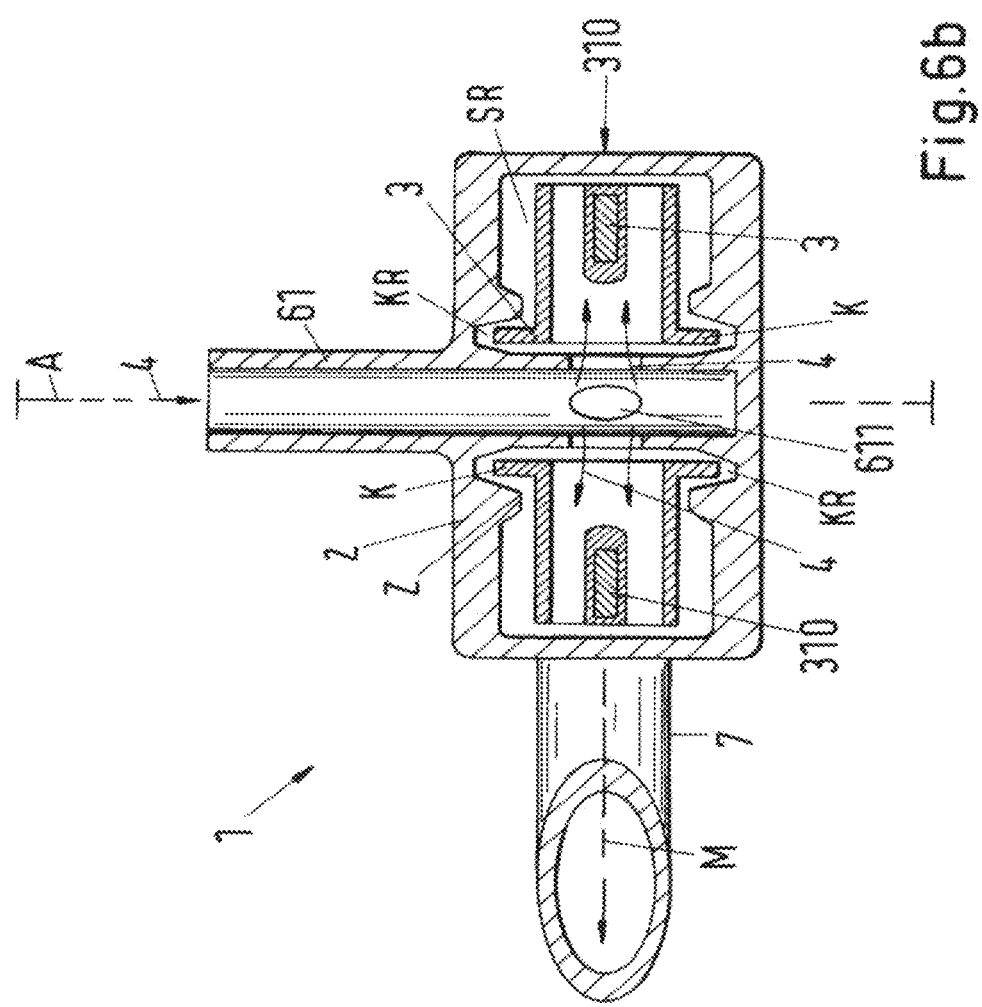

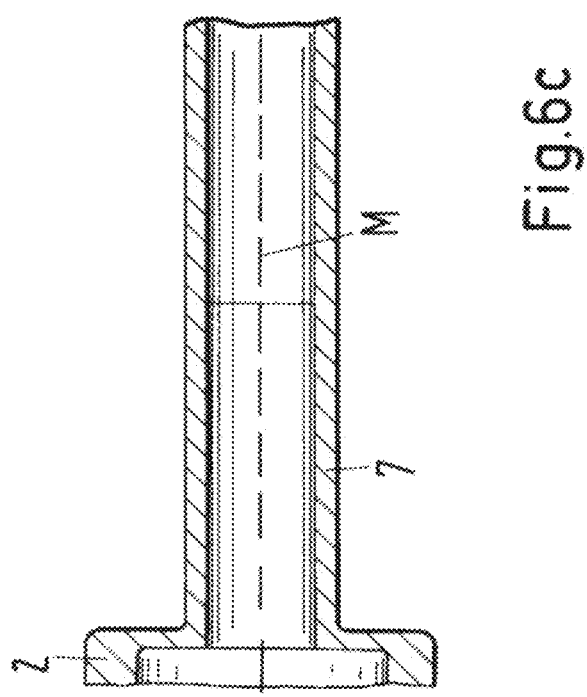

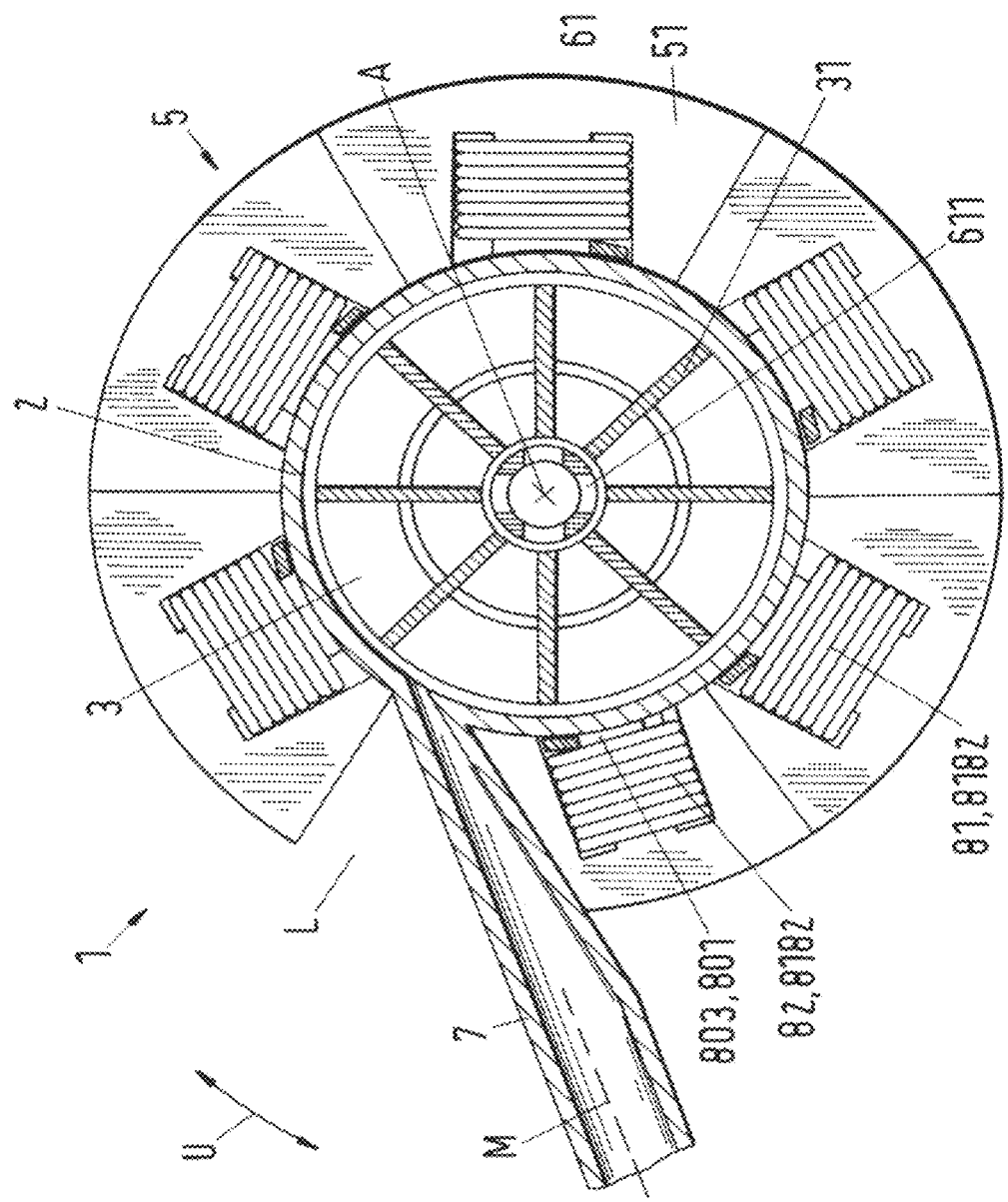

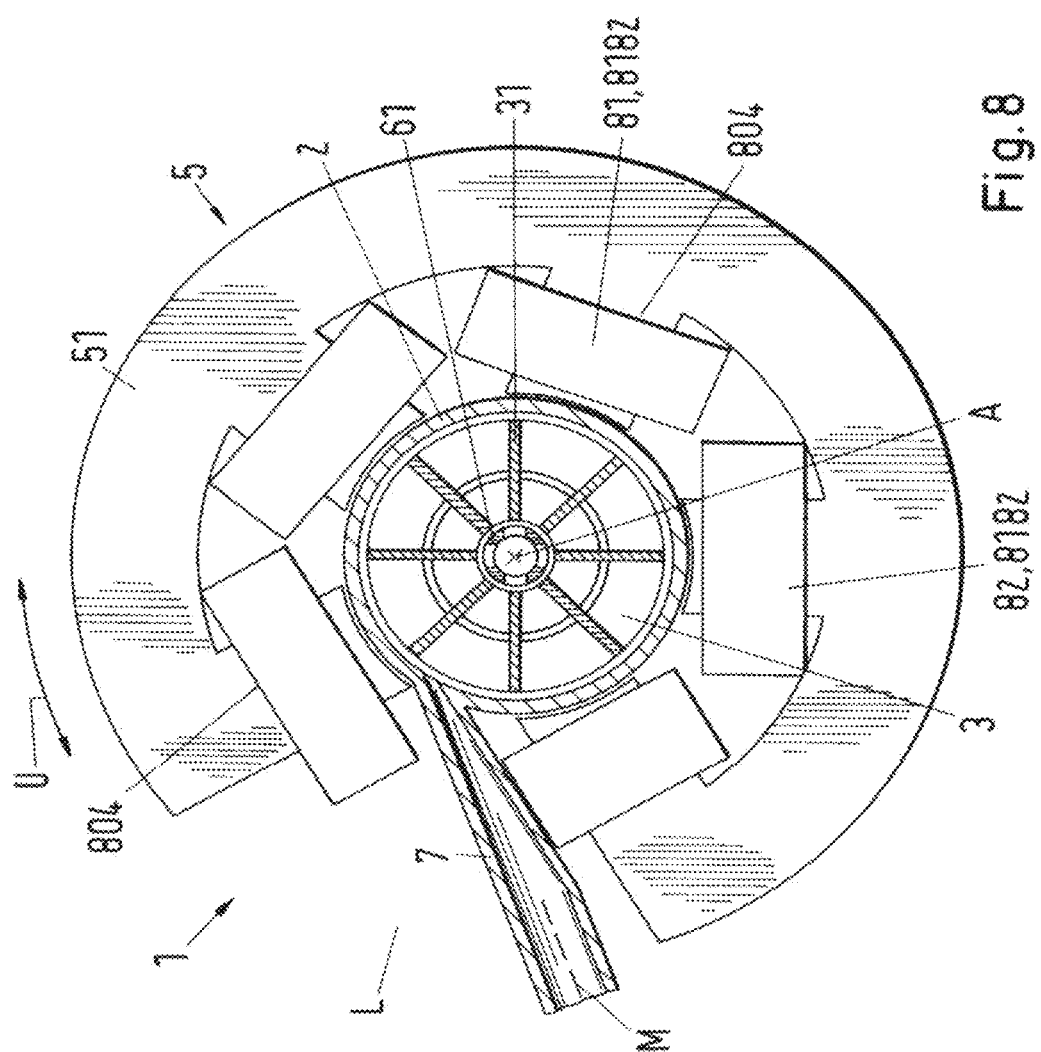

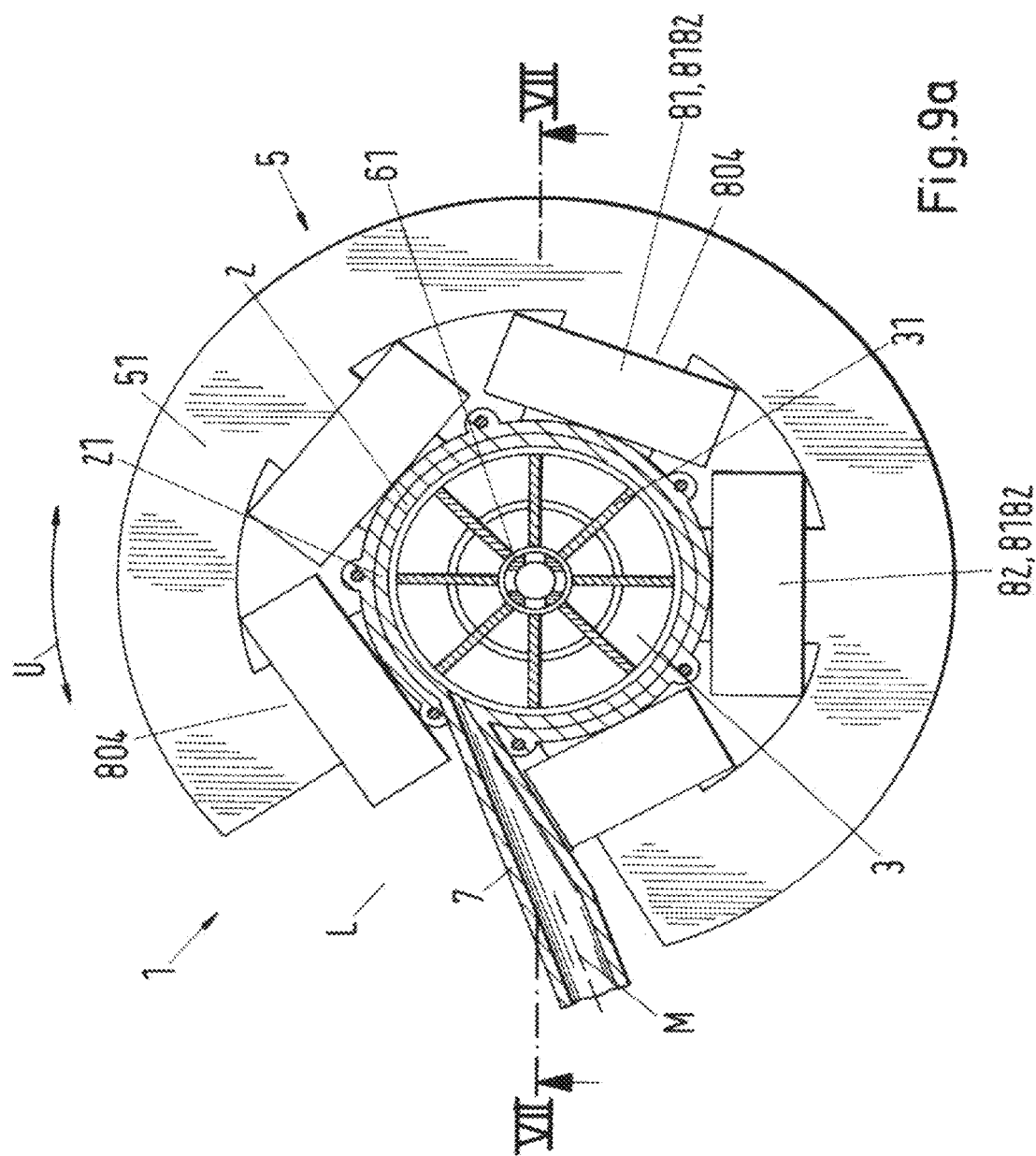

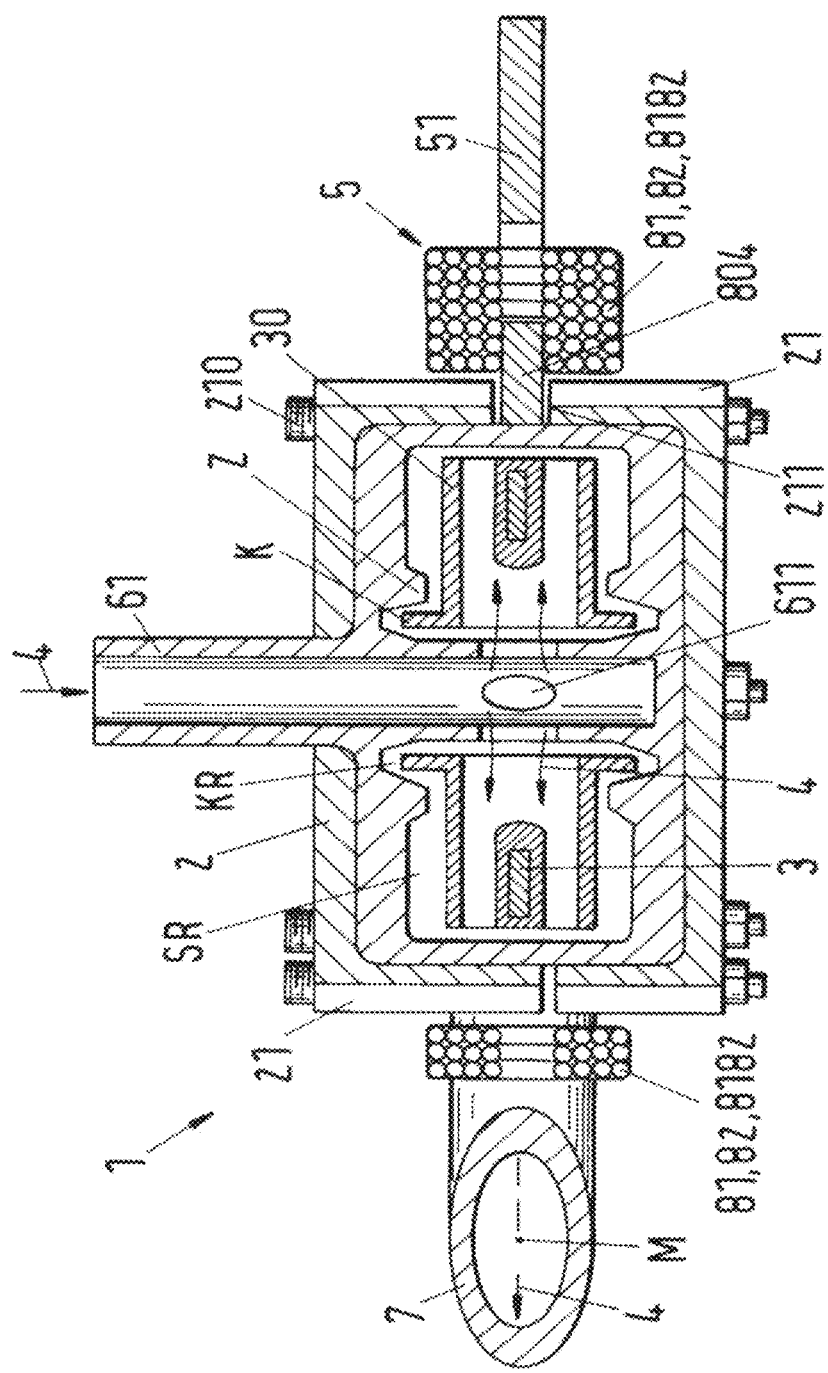

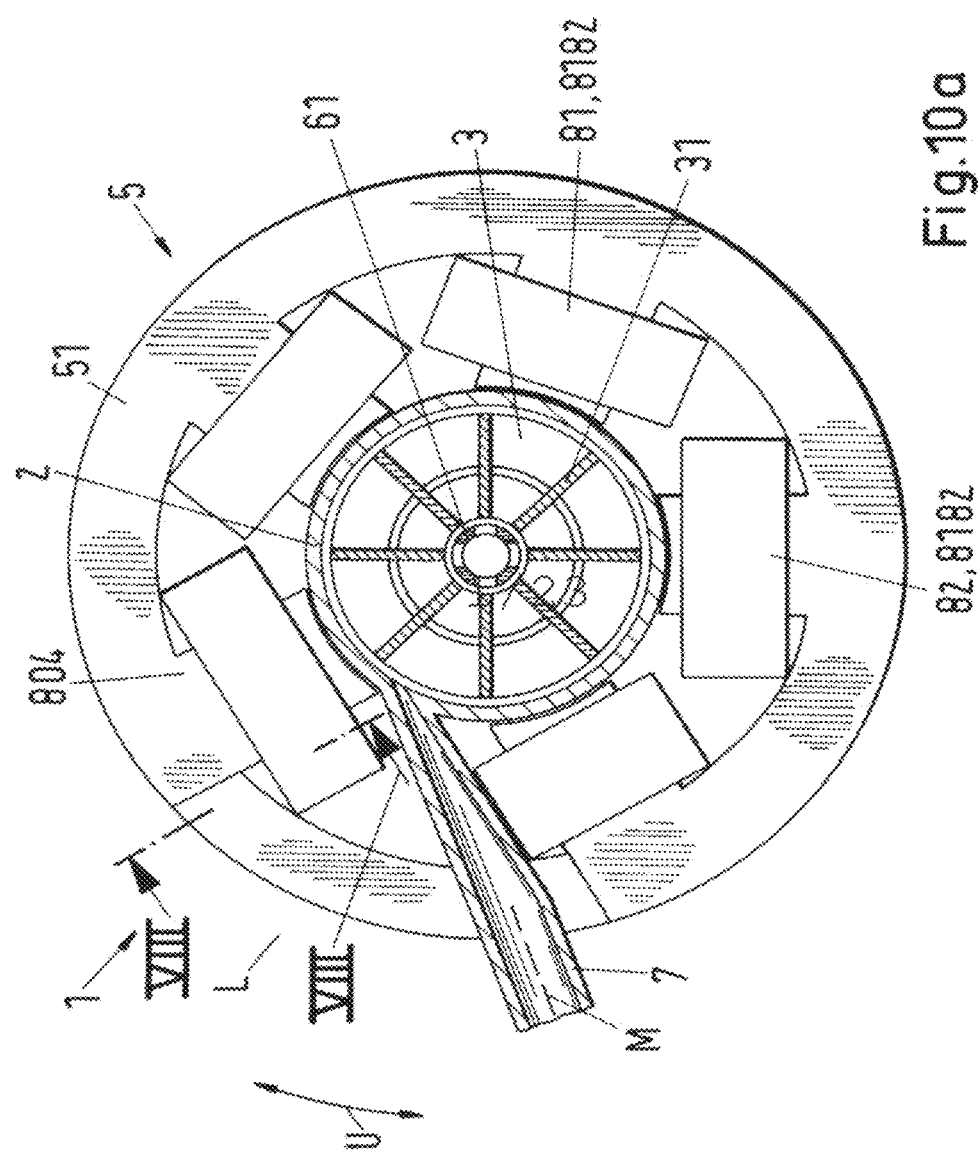

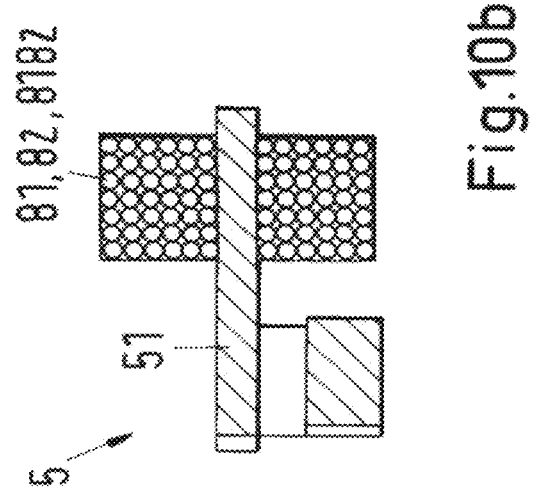

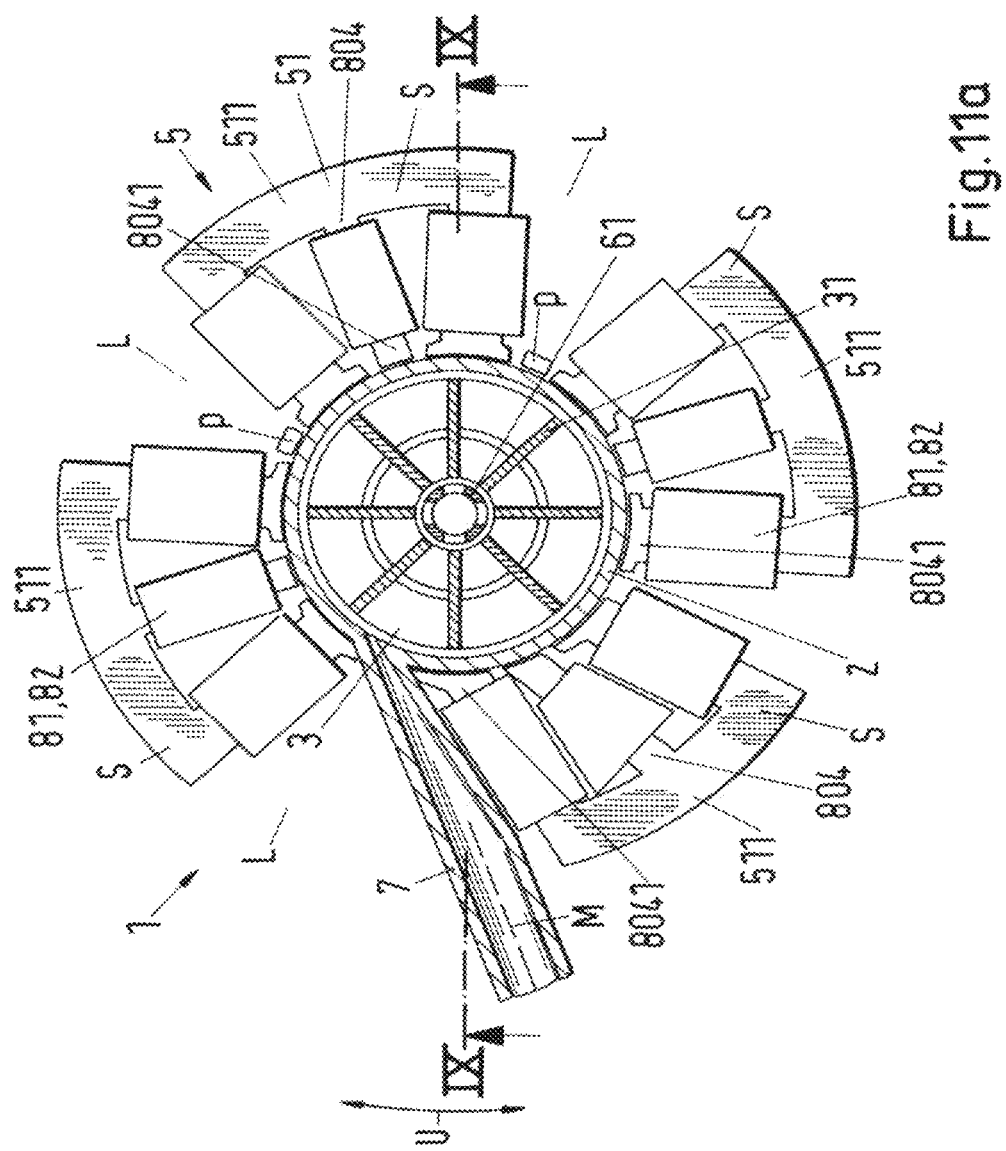

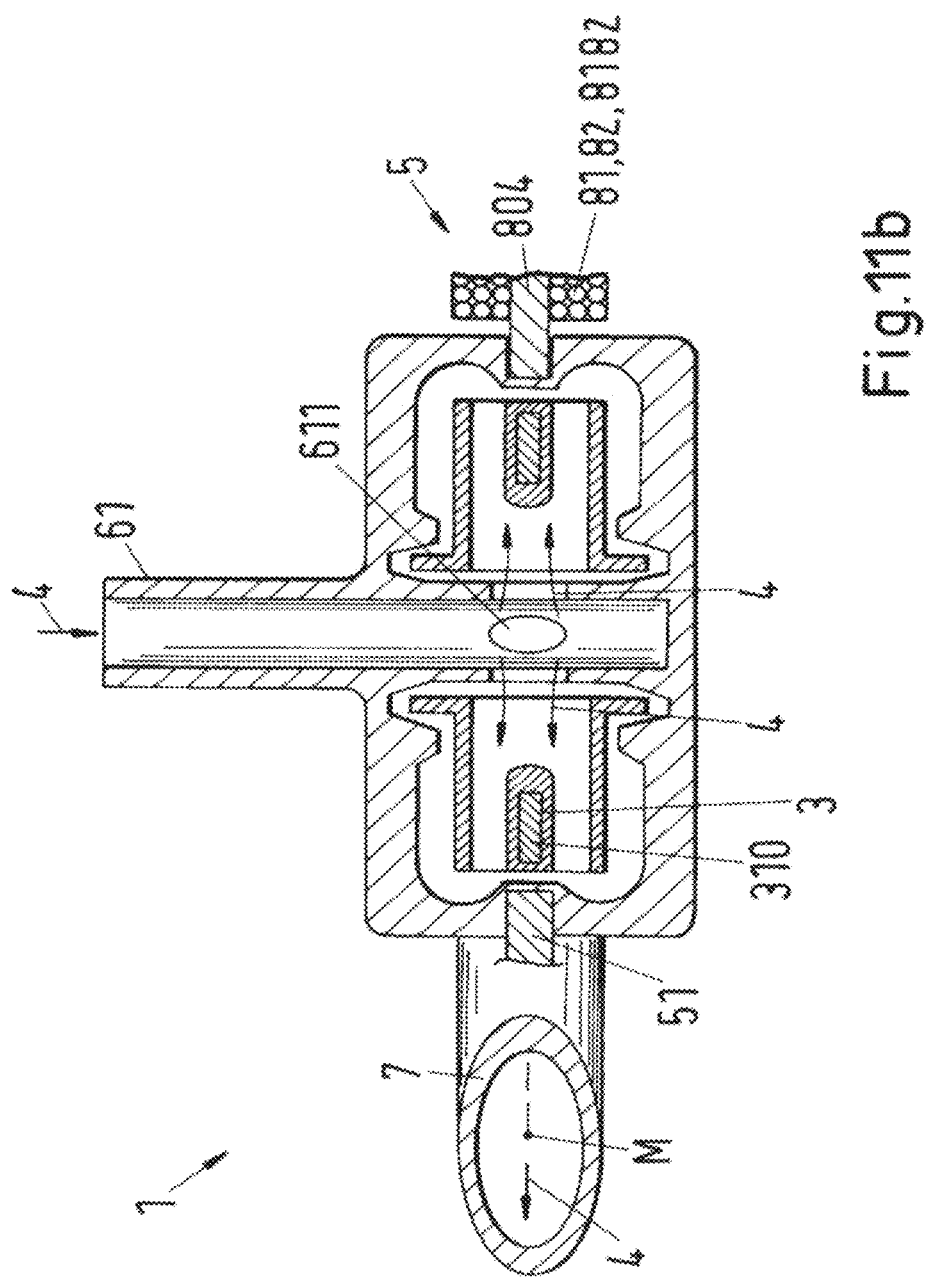

ROTARY PUMP

CROSS-REFERENCES TO RELATED APPLICATIONS

This application is a continuation application of U.S. patent application Ser. No. 13/820,491 filed Sep. 1, 2010 entitled "Rotary Pump", now U.S. Pat. No. 9,835,158 B2, which is a U.S. National Phase under 35 USC 371 of PCT Application No. PCT/EP2010/062789 filed Sep. 1, 2010, the disclosures of which are incorporated by reference herein.

BACKGROUND OF THE INVENTION

The invention relates to a rotary pump having a bearingless motor in accordance with the preamble of independent claim 1.

Magnetically journalled rotary pumps have established themselves in the art for specific applications in which an impeller is floatingly journalled by magnetic forces in the interior of a preferably completely closed pump housing and is driven by a rotating field which is generated by a stator arranged outside the pump housing. Such pumps are in particular advantageous for such applications in which the fluid to be conveyed may not be contaminated, for example for conveying biological liquids such as blood or very pure liquids such as ultrapure water.

In addition, such rotary pumps are suitable for conveying aggressive liquids which would destroy mechanical bearings in a short time. Such rotary pumps are therefore particularly preferably used in the semiconductor industry, for example for conveying mechanically aggressive fluids on the processing of a surface of semiconductor wafers. Chemomechanical polishing processes (CMP, chemomechanical planarization) can be named as an important example here. In such processes, a suspension, usually called a slurry, of typically very fine solid particles and a liquid is applied to a rotating wafer and there serves for the polishing or lapping of the very find semiconductor structures. Another example is the application of photoresist to the wafer or the roughening of surfaces of computer hard disks to prevent an adhesion of the writing/reading heads by adhesion forces, that is, for example, by Vsn der Waals forces.

In this respect, in a bearingless motor, the rotor is often configured in plate shape or ring shape, with in many cases the height of the rotor being less than half the diameter of the rotor.

Such a bearingless motor is disclosed, for example, in WO-A-96/31934 or in another variant also in EP-A-0 900 572. The term bearingless motor within the framework of this application means that the motor is journalled completely magnetically, with no separate magnetic bearings being provided. For this purpose, the stator is configured as a bearing and drive stator; it is therefore both the stator of the electric drive and the stator of the magnetic journalling. For this purpose, the winding of the stator includes a drive winding with a pole pair number p as well as a control winding of the pole pair numbers p±1. A rotating magnetic field can be produced using these two windings which, on the one hand, exerts a torque onto the rotor which effects its rotation and which, on the other hand, exerts a shear force, which can be set as desired, onto the rotor so that the rotor's radial position can be controlled or regulated actively.

Three degrees of freedom of the rotor can thus be actively regulated. The rotor is passively magnetically stabilized, that is not controllably, but rather magnetically stabilized by reluctance forces with respect to three further degrees of freedom, namely its axial deflection in the direction of the axis of rotation and tilts with respect to the plane perpendicular to the axis of rotation (two degrees of freedom.

In particular when the rotor is configured as a plate shaped or ring shaped rotor, the passive magnetic journalling makes high demands on the axial stabilization or on the stabilization with respect to tilts because the rotor only passively magnetically journalled in the axial direction and with respect to tilts only has a small axial stiffness.

So that the axial thrust which occurs and which is mainly caused by the pressure difference present between the inlet and the outlet of the pump does not have to be completely taken up by the axial bearings, very different measures are known in centrifugal pumps to balance the rotor with respect to the axial direction.

The problem of the axial thrust balance is thus particularly serious in pumps with a magnetically journalled rotor, in particular when the axial journalling takes place magnetically via reluctance forces completely without mechanical bearings. To balance the rotor of such a bearingless motor, in addition to the magnetic reluctance force, only construction measures are available which influence the axial position via fluid dynamic compensation forces.

Measures known today for the axial balancing of the rotor for high pump performances or with more highly viscous fluids, such as photoresist or slurry, which can have viscosities of up to more than 100 centipoise, are in particular also often not sufficient with such centrifugal pumps which work in accordance with the principle of the bearingless motor.

There is the problem in the configuration of such rotary pumps as centrifugal pumps that the winding heads of the stator and the outlet or possibly also the inlet of the pump housing impede one another spatially.

To solve this problem, a pump is proposed in WO-A-96/31934 having a so-called temple motor in which the coil cores of the stator each have the shape of an "L", with the long limb in each case extending parallel to the axis of rotation, whereas the short limb is directed radially inwardly to the axis of rotation. The stator, which is configured as a bearing and drive stator, has two windings, namely the drive winding and the control winding, which are configured as discrete coils and are wound around the long limbs of the L-shaped coil cores. Such a temperature manages without winding heads so that the outlet of the pump housing can be arranged without spatial hindrance at the level of the impeller in the form of a radial outlet passage. This means that it is possible with the temple motor that a radial outlet passage can be arranged at the pump housing so that the drive, more exactly a magnetic stator plane of the stator of the motor, and a center plane of the rotor, coincides with a center axis of the radial outlet passage.

I.e. both the magnetic center plane of the drive and bearing stator and the center plane of the rotor are at the same height as a center axis of the radial outlet passage of the pump housing so that the hydraulic forces which act on the rotor through the drainage of the fluid via the radial outlet passage act symmetrically on the rotor with respect to the axial direction or with respect to the center plane of the rotor. The hydraulic forces acting on the rotor in the axial direction thereby compensate one another so that no additional measures are required for compensating such axial thrust forces. In brief: The temple motor allows an arrangement of the outlet or also of the inlet at the pump housing symmetrical with respect to the center plane of the rotor.

This embodiment as a temple motor, e.g. in accordance with FIG. 12 of WO 96/31934, is, however, subject to the restriction that it has a relatively large space requirement and is complex and/or expensive in design due to the high construction shape. In addition, so-called back-to-back rotor arrangements (see below) are admittedly possible in principle in dependence on the construction shape, but can often only be realized with difficulty, if at all, depending on the specific embodiment of the pump housing, in particular because one of the feeds to the pump housing has to be conducted through the temple of the temple motor.

The mentioned back-to-back arrangements are as mentioned likewise shown in examples in WO 96/31934. The rotor is here equipped, with respect to the axial direction which is equal to the axis of rotation of the rotor, at both sides with conveying means such as vanes so that the rotor is acted on with the pressure of the fluid flowing into the pump housing at both sides and substantially uniformly via two axially mutually oppositely disposed inlet passages so that a resulting axial thrust is thereby substantially prevented. The drive is, however, here only possible by means of a temple motor since otherwise the outlet passages of the pump housing would have to be arranged asymmetrically with respect to the center plane of the rotor disk, which would in turn result in huge hydraulic axial forces onto the rotor via the outlet passages.

Another rotary pump having a bearingless motor is shown in EP 0 900 572 A1 which admittedly dispenses with the temple motor, which is very large and complex from a construction aspect; however, this is obtained at the cost of a very asymmetrical arrangement of the inlet and outlet of the pump housing so that relatively large axial hydraulic forces accordingly arise which can only be compensated at all by specific construction measures up to a specific amount and not in all desired operating states. The areas of use for this kind of pumps are thus correspondingly restricted.

With the exception of the above-described temple motors, a general problem of bearing less motors which are passively magnetically journalled in the axial direction only via reluctance forces, summarized in that the drive, that is the stator of the motor, coincides with a center plane of the rotor. I.e. a center plane of the drive and bearing stator and the center plane of the rotor are at the same height so that at least the outlet passage of the pump housing has to be arranged very asymmetrically with respect to the center plane of the stator, which results in corresponding relatively large axial hydraulic forces which have to be compensated in a complex and/or expensive manner with other means.

In brief: The stator prevents a symmetric arrangement of the outlet or of the inlet with respect to the center plane of the rotor.

BRIEF SUMMARY OF THE INVENTION

It is therefore the object of the invention to propose a new, completely magnetically journalled rotary pump which avoids the disadvantages known from the prior art, which has a compact construction and in which the occurrence of axial thrust forces is substantially prevented.

The subjects of the invention satisfying these objects are characterized by the features of independent claim 1.

The dependent claims relate to particularly advantageous embodiments of the invention.

The invention thus relates to a rotary pump including a magnetic rotor arranged in a pump housing and having a magnetic rotor plane, which rotor is operatively connected to a drive for conveying a fluid. An inlet opening for the inlet of the fluid into the pump housing and a radial outlet passage for conveying the fluid from the pump housing are provided at the pump housing. In this respect, the drive is a bearingless motor having a stator configured as a bearing stator and drive stator with a magnetic stator plane, wherein the stator carries a drive coil and bearing coil and/or a drive bearing coil lying in the stator plane. The rotor is journalled in a magnetically contactless manner within the stator, wherein an axial height of the rotor is smaller than or equal to half a diameter of the rotor so that the rotor is passively magnetically stabilized by reluctance forces with respect to the magnetic stator plane both against axial displacement and against a tilt from a equilibrium position. In accordance with the invention, the outlet passage is radially outwardly conducted away from the pump housing in the region of the stator such that a center axis of the radial outlet passage coincides with the magnetic rotor plane or with the magnetic stator plane.

It is thus important for the invention that the outlet passage is radially outwardly conducted away from the pump housing in the region of the stator such that the center axis of the radial outlet passage coincides with the magnetic rotor plane and/or with the magnetic stator plane. This means that the extension of the center axis of the outlet passage defines, together with the magnetic stator plane and/or together with the magnetic rotor plane, a common plane in space which is substantially perpendicular to an axis of rotation of the rotor, with the drive coils and bearing coils lying in the stator plane. That is, unlike with the temple motor in which the drive coils and the bearing coils are wound perpendicular to the magnetic stator plane about the long limbs of the L-shaped coil cores.

I.e. the magnetic center plane of the drive stator and bearing stator and/or the center plane of the rotor lie, together with the coil axes of the drive coils and bearing coils and together with a center axis of the radial outlet passage of the pump housing, at substantially the same level so that the hydraulic forces which act on the rotor by the draining of the fluid via the radial outlet passage act symmetrically on the rotor with respect to the axial direction or with respect to the center plane of the rotor. The hydraulic forces acting on the rotor in the axial direction thereby compensate one another so that no additional measures are required for compensating such axial thrust forces. The invention thus for the first time allows an arrangement of the outlet, or in principle also the inlet, symmetrically with respect to the center plane of the rotor at the pump housing, wherein an initially described bearingless motor is provided as the drive which is not configured as a temple motor. Since the drive is, unlike the prior art, not configured as a temple motor, the rotary pump in accordance with the invention has a space-saving compact construction and the drive is very simple in its structure.

For the reception of the outlet passage, the stator preferably has a corresponding gap in the peripheral direction, in which gap the radial outlet passage is arranged and is outwardly conducted away from the pump housing beyond the stator. The stator itself can in this respect be ferromagnetic or can also be made from a non-ferromagnetic material, which is substantially co-determined by the kind of coil cores used, as will be explained in more detail further below.

The drive coil and/or the bearing coil and/or the drive bearing coil are provided in a manner known per se at a coil core, wherein a drive coil and a bearing coil can each be provided on one and the same coil core or a drive coil and a bearing coil can each be provided separately on their own coil core. Instead of separate drive coils and bearing coils, a drive bearing coil can preferably also be provided, i.e. a single coil on which both the drive current and the bearing current are applied in the operating state from a suitable controlled or regulated electric energy source. Such drive bearing coils are known in principle and are e.g. described in EP 1 158 648 A1 or EP 1 301 979 B1.

The coil core itself can in this respect have a different configuration. The coil core can, for example, be provided in the form of an E-shaped ferromagnetic coil core at the stator. An E-shaped coil core is in particular advantageously used when the stator is made of a non-ferromagnetic material. On the use of a stator which is not made of a ferromagnetic material such as iron, the magnetic flux cannot be closed via the non-ferromagnetic stator. In such a case, E-shaped coil cores can be used which are made in the form of an "E" from three specifically more or less parallel limbs, wherein the coil is preferably wound onto the middle one of the three limbs. With such an arrangement, the magnetic flux is closed in or via the E-shaped core itself so that an additional magnetic reflux via a ferromagnetic stator is admittedly possible, but not necessary in principle.

In particular when the stator is made of a ferromagnetic material, the coil core can be provided in the form of a bar-shaped, preferably likewise ferromagnetic coil core at the stator, for example at an upper side or at a lower side of the stator. With a bar-shaped coil core, the magnetic flux does not have to be closed in or via the coil core itself, but must rather, for example, be closed via a ferromagnetic stator.

The preferably ferromagnetic coil core can naturally also be provided in the form of an inner coil core within the likewise preferably ferromagnetic stator, or the preferably ferromagnetic coil core can in another embodiment also be configured in the form of a stator tooth extending toward the rotor at the stator.

The arrangements and configurations previously set forth by way of example and furthermore still possible of coil cores wound with drive coils and/or bearing coils and/or drive bearing cores are known per se to the skilled person and can also advantageously be used in further embodiments or combinations not described in any more detail here, in a drive for a rotary pump in accordance with the invention depending on the application.

In this respect, it is in particular possible that two different coil cores are configured geometrically differently at one and the same stator and/or two drive coils and/or two bearing coils are arranged asymmetrically with respect to the peripheral direction of the stator.

Such an asymmetric arrangement of the bearing coils and/(or drive coils at the stator can in particular be advantageously carried out or can even be absolutely necessary when the stator has a more or less large gap through which the outlet passage is radially outwardly conducted away from the pump housing. Particularly, but not only, when the stator is a ferromagnetic stator, a substantial asymmetry in the magnetic flux can be caused by the gap in the stator which asymmetry is compensated again, for example, by a suitably selected asymmetrical configuration and/or arrangement of the coil cores for the drive coils and bearing coils such that a secure active radial journalling and a secure drive of the rotor nevertheless remains ensured.

The rotor is particularly preferably acted on at both sides by the fluid flowing into the pump housing with respect to an axial axis of rotation which stands substantially perpendicular on the rotor plane and/or on the stator plane. This can advantageously be realized, for example, in that, with respect to the rotor plane, two oppositely disposed inlet passages are provided. It is also possible, for example, that only one axially extending inlet channel is provided which is arranged centrally about the axis of rotation and which extends through the rotor, wherein outlet openings are provided at both sides at such an axial inlet passage with respect to the magnetic rotor plane for acting on the rotor by the fluid at both sides. It is self-explanatory that when the rotor is acted on by the fluid to be pumped at both sides simultaneously, the rotor is particularly preferably also equipped on both sides with means for pumping, specifically with rotor vanes, so that a symmetrical pumping power toward the radial outlet passage can be generated at both sides with respect to the center plane of the rotor.

It is in another respect self-explanatory in this connection that in special cases naturally more than one outlet passage can also be provided at the pump housing via which a fluid to be pumped can be conveyed outwardly out of the pump housing at elevated pressure.

BRIEF DESCRIPTION OF THE DRAWINGS

The invention will be explained in more detail in the following with reference to the drawing. There are shown in a schematic representation:

FIG. 1b illustrates a section along the line I-I in accordance with FIG. 1a;

FIG. 2a illustrates a second embodiment of a rotary pump in accordance with the invention with an E-shaped coil core;

FIG. 3a illustrates an embodiment of a rotary pump in accordance with the invention with a single axial inlet passage;

FIG. 3b illustrates a section along the line II-II in accordance with FIG. 3a;

FIG. 4 illustrates another embodiment in accordance with FIG. 3a with a covered rotor;

FIG. 5a illustrates a further embodiment in accordance with FIG. 3a with a covered rotor;

FIG. 5b illustrates a section along the line III-III in accordance with FIG. 5a;

FIG. 5c illustrates a section along the line IV-IV in accordance with FIG. 5a;

FIG. 6a illustrates a fourth embodiment in accordance with FIG. 3a with a covered rotor and an asymmetrical outlet passage;

FIG. 6b illustrates a section along the line V-V in accordance with FIG. 6a;

FIG. 6c illustrates a section along the line VI-VI in accordance with FIG. 6a;

FIG. 7 illustrates an embodiment of a rotary pump in accordance with the invention with an inner coil core within the stator;

FIG. 8 illustrates an embodiment with a stator tooth extending to the rotor;

FIG. 9a illustrates a second embodiment in accordance with FIG. 8 with a housing shell for the pump housing;

FIG. 9b illustrates a section along the line VII-VII in accordance with FIG. 9a;

FIG. 10a illustrates another embodiment in accordance with FIG. 8 with an iron ring as a magnetic gap closure;

FIG. 10b illustrates a section along the line VIII-VIII in accordance with FIG. 10a;

FIG. 11a illustrates a further embodiment in accordance with FIG. 8 with geometrically differently configured coil cores; and FIG. 11b illustrates a section along the line IX-IX in accordance with FIG. 11a.

DETAILED DESCRIPTION OF THE INVENTION

Figure 1A:
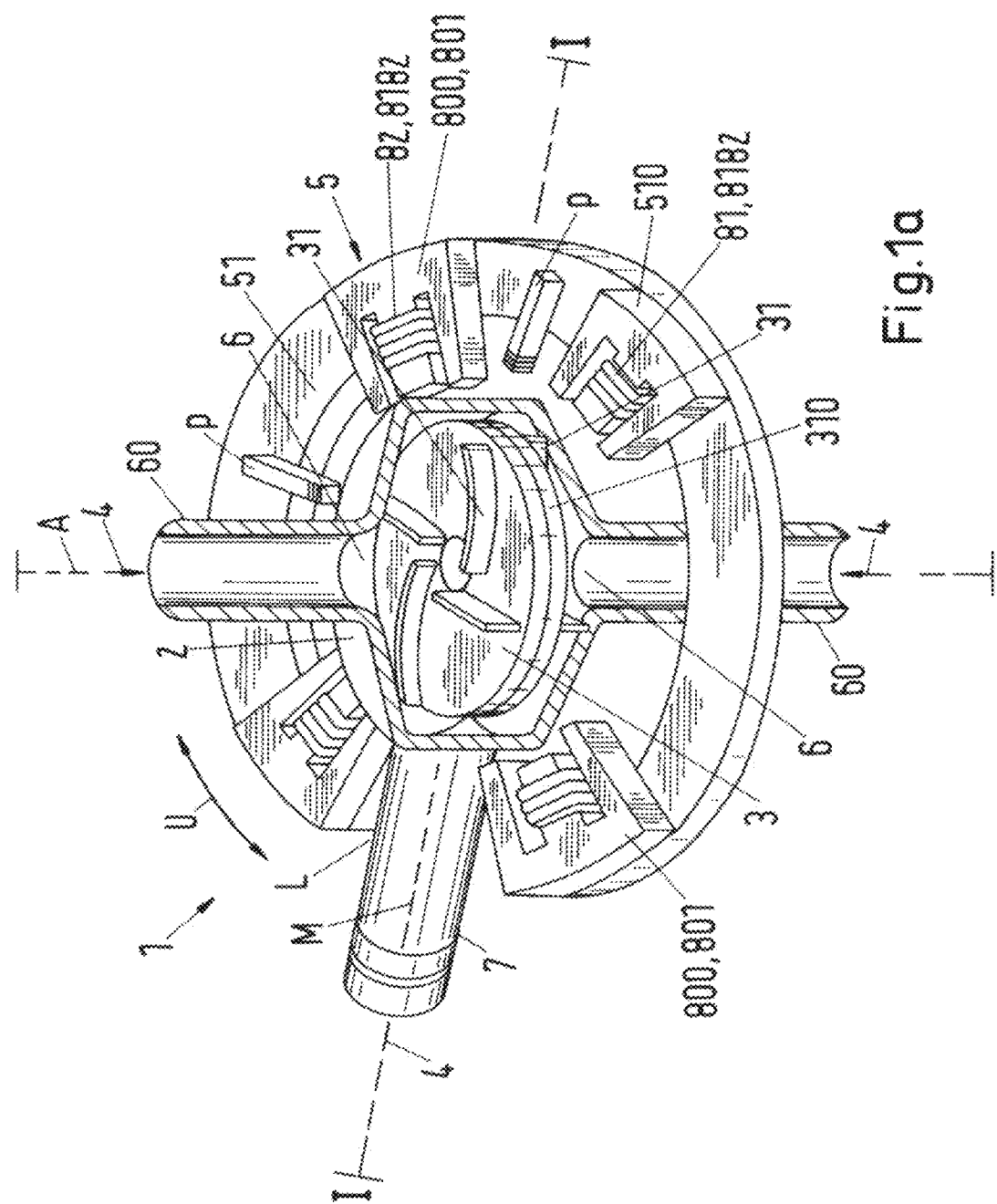
FIG. 1a illustrates a first embodiment of a rotary pump in accordance with the invention with an E-shaped coil core.

FIG. 1a shows in a schematic manner in a slightly perspective representation a simple first embodiment of a rotary pump in accordance with the invention with E-shaped coil cores, wherein with reference to FIG. 1b a section along the line I-I in accordance with FIG. 1a is additionally shown schematically for better understanding.

The rotary pump in accordance with the invention which is designated as a whole by the reference numeral 1 in the following includes a magnetic rotor 3 which is arranged in a pump housing 2 and has a magnetic rotor plane 310, which rotor 3 is in magnetic interaction with a drive 5 for conveying a fluid 4. The drive 5 is a bearingless motor having a stator 51 which is configured as a bearing stator and drive stator and has a magnetic stator plane 510, wherein the stator 51 bears a plurality of drive coils 81 and bearing coils 82 lying in the stator plane, or also, simultaneously or alternatively, can bear drive bearing coils 8182 which can either each be provided on different coil cores 800, 801 or, simultaneously or alternatively, also in each case in twos or more on one and the same coil core 800, 801.

In the specific embodiment in accordance with FIG. 1a, exactly four coil cores 800, 801 are provided by way of example. In this case, the coils wound thereon are drive bearing coils 8182. It is understood that, with an otherwise same geometry of the rotary pump 1, more than exactly for coil cores can also be provided at the stator 51. It is then possible that either separate drive coils 81 and bearing coils 82 are provided or also, simultaneously or alternatively, drive bearing coils 8182 are used.

The rotor 3 is journalled in a magnetically contactless manner in a manner known per within the stator 51. It is in this respect a thin plate-shaped or ring-shaped rotor 3 which is characterized in that an axial height H of the rotor 3 is smaller than or equal to half a diameter D of the rotor 3. The thin plate-shaped or circular ring-shaped rotor 3 is passively magnetically stabilized by reluctance forces both against an axial displacement and against a tile from a equilibrium position in a manner likewise known to the skilled person with respect to the magnetic stator plane 510.

That is, with respect to the axial direction, the position of the rotor 3 is only passively magnetically stabilized against tilting via reluctance forces with respect to the rotary axis 310 or against a displacement along the axis of rotation A, whereas a position of the rotor 3 with respect to the radial direction can be actively influenced by means of magnetic rotational fields via the drive coil 81 and/or bearing coils 82 and/or the drive bearing coils 8182. The rotary drive of the rotor 3 naturally likewise takes place via corresponding magnetic rotational fields which are generated by the drive coil 81 and/or bearing coils 82 and/or the drive bearing coils 8182.

At both sides of the magnetic rotor plane 310, a respective inlet opening 6 is provided at the pump housing 2 for the inlet of the fluid 4 such that the rotor 3 can be acted on at both sides with respect to the axis of rotation A by the fluid 4 flowing into the pump housing 2 via two oppositely disposed inlet passages 60. The rotor 3 is therefore also equipped at both sides with means 31 for pumping, that is, for example, with rotor impellers 31 or rotor vanes 31, so that a symmetrical pump performance can be generated with respect to the rotor plane 310 up to the radial outlet passage 7. In the sectional representation of FIG. 1b, the rotor impellers 31 are not shown for reasons of clarity.

Since the rotor 3 is acted on simultaneously and symmetrically at both sides with respect to the magnetic rotor plane 310 by the fluid to be pumped and flowing into the pump housing 2, substantially no resulting hydraulic forces occur in the axial direction by the fluid 4 flowing into the pump housing 2 which could destabilize the rotor 3 in the axial direction in the operating state.

In accordance with the invention, in the region of the stator 51, the outlet channel 7 is radially outwardly conducted away from the pump housing 2 through a gap L in the stator 51 such that a center axis M of the radial outlet passage 7 coincides with the magnetic rotor plane 310 and with the magnetic stator plane 510 except for possibly very small differences which are induced by operation or by construction.

A magnetic rotor plane 310 is thus designated within the framework of this application as that plane of the rotor 3 which coincides with the center axis M of the radial outlet channel 7 when all resulting forces on the rotor which act on the rotor 3 in the axial direction substantially disappear. The magnetic stator plane 510 is accordingly that plane of the stator 5 which coincides with the magnetic rotor plane 310 when all resulting forces which act on the rotor 3 in the axial direction substantially disappear.

This in particular means that within the framework of the present invention the magnetic rotor plane 310 or the magnetic stator plane 510 are defined in the aforesaid manner via the compensation of all axial forces in balance and not via the geometry of the stator 51 or of the rotor 3. The magnetic stator plane 510 thus does not necessarily have to be identical to the geometrical axial symmetry plane of the stator 51 which is as a rule defined via half the geometrical height of the stator 51.

Very frequently, but by no means necessarily, the magnetic rotor plane 310 of the rotor 3 is identical to the geometrical axial symmetry plane of the rotor 3 which is defined via half the height H of the rotor 3. This is due to the fact that the rotor 3 is in most practical cases configured symmetrically with respect to the axial direction, that is with respect to the axis of rotation A, since all resulting axially active forces can thus be made to disappear in a particularly simple manner so that the rotor 3 can be reliably stabilized in the axial direction in the operating state via the relatively weak magnetic reluctance forces. The core of the rotor 3 is as a rule formed by a core from a permanently magnetic material which is surrounded, for example, in a fluid-tight manner by a housing, e.g. by a plastic housing, on which the rotor vanes 31 are then outwardly provided. Such rotors 3 have long been known from the prior art.

As can in particular clearly be seen from FIG. 1b, the magnetic stator plane 510 is in no way in every case identical to the geometrical symmetry plane at half the geometrical height of the stator 21. This is inter alia due to the fact that the specific stator 51 in accordance with FIG. 1a and FIG. 1b respectively is not made from a ferromagnetic material for weight reasons, but rather from a very light plastic, said stator 651 only serving as a carrier for the E-shaped coil cores 800, 801. The stator 51 in the present example therefore does not have to be configured as a ferromagnetic stator because the coil cores 800, 801 are configured in E shape with three limbs, wherein the coils are each wound onto the middle limb so that the reflux of the magnetic flux can take place via the limbs of the E-shaped coil cores 800, 801 and does not have to take place via the stator 51. It is understood in this respect that the stator 51 can naturally also be made of a ferromagnetic material when E-shaped coil cores 800, 801 are used.

The coil cores 800, 801 are in this respect distributed along a peripheral direction U at the stator 51 such that a reliable drive and a secure journalling of the rotor 3 is possible in the radial direction in every operating state and is actively ensured via the drive coils 81 and/or via the bearing coils 82 and/or the drive bearing coils 8182.

To control or regulate the rotor 3 in the operating state, position sensors P are provided at the stator 51 with which the position of the rotor 3 in the operating state can be determined at any time and can be used for actively controlling the rotor 3.

A second embodiment of a rotary pump 1 in accordance with the invention having an E-shaped coil core is shown in FIG. 2*a*. The example of FIG. 2*a* is substantially identical to that of FIGS. 1*a* and 1*b* respectively, but with the exception that the embodiment in accordance with FIG. 2*a* has a much more compact construction in the axial direction, that is with respect to the direction of rotation A. This is achieved in that the feeds to the two inlet openings 67 at the pump housing 2 are not realized by two oppositely disposed axially extending inlet passages 60, but rather by two inflow passages 600 of V shape which adopt an angle close to 90° with respect to the axis of rotation A and are fed by a single inflow 601. To ensure the mechanical stability of the stator 51, a ring-shaped bridge element 52 made from light plastic is provided which mechanically closes the gap L through which the outlet passage 7 is conducted radially outwardly away from the pump housing 2. An additional gap L1 is provided in the stator 51 for the inflow passages 600 of V shape or for the inflow 601.

Figure 2B:
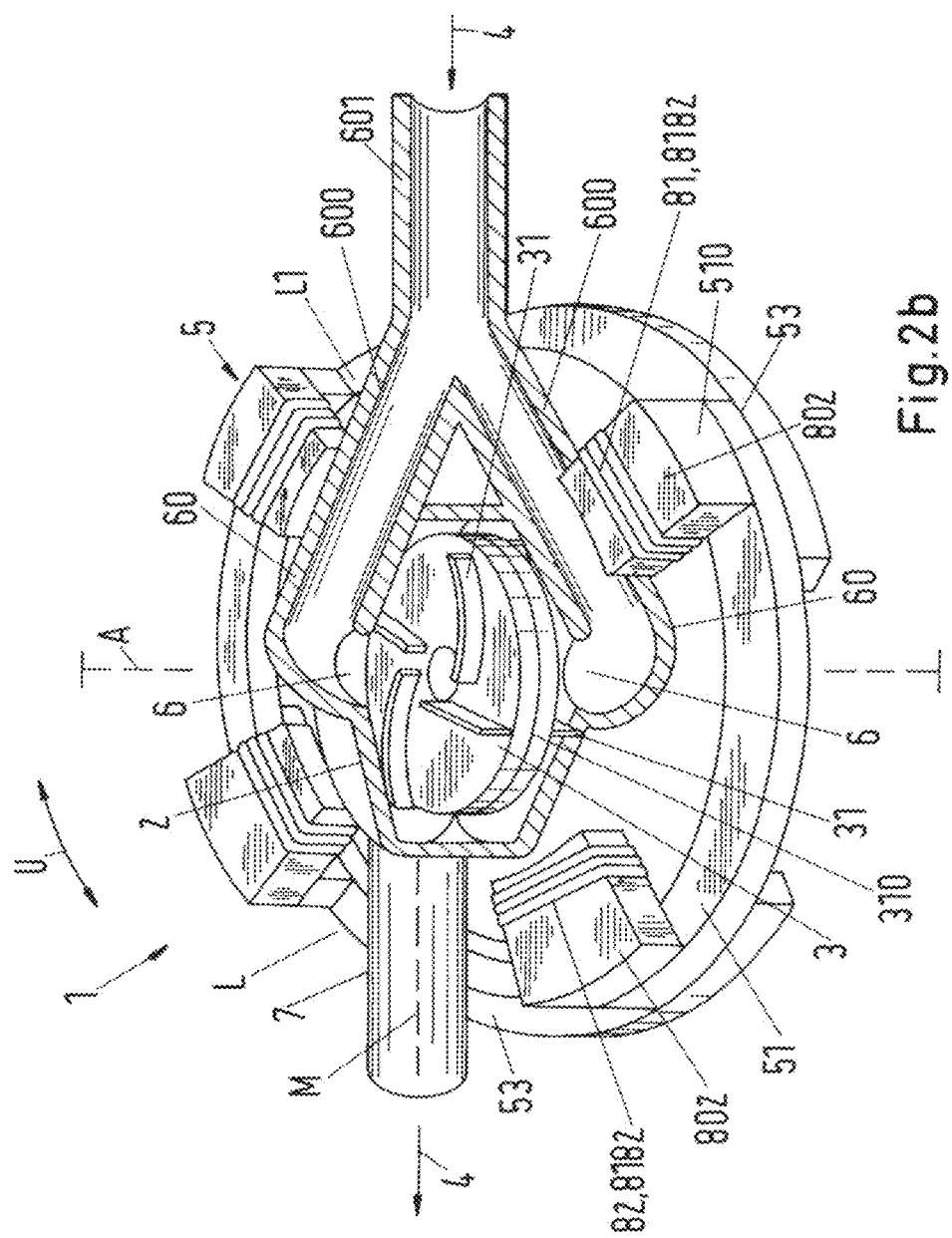
FIG. 2b illustrates an embodiment in accordance with FIG. 2a with a bar-shaped coil core.

FIG. 2*b* shows an embodiment in accordance with FIG. 2*a* having a bar-shaped coil core 802. Since the coil cores 802 are configured in bar shape and not in E shape, the reflux of the magnetic flux has to be take place via the stator 51. The stator 51 of the rotary pump 1 in accordance with FIG. 2*b* is therefore also a ferromagnetic stator 51, which is made of iron here. In order, on the one hand, to ensure the mechanical stability of the stator 51 and simultaneously to ensure a magnetic reflux for the magnetic flux which is as reliable as possible via the stator 51, a respective ferromagnetic ring-shaped closure element 53 is provided at the gaps L and L1, said closure elements likewise being made from iron in the example of FIG. 2*b*.

Figure 2C:
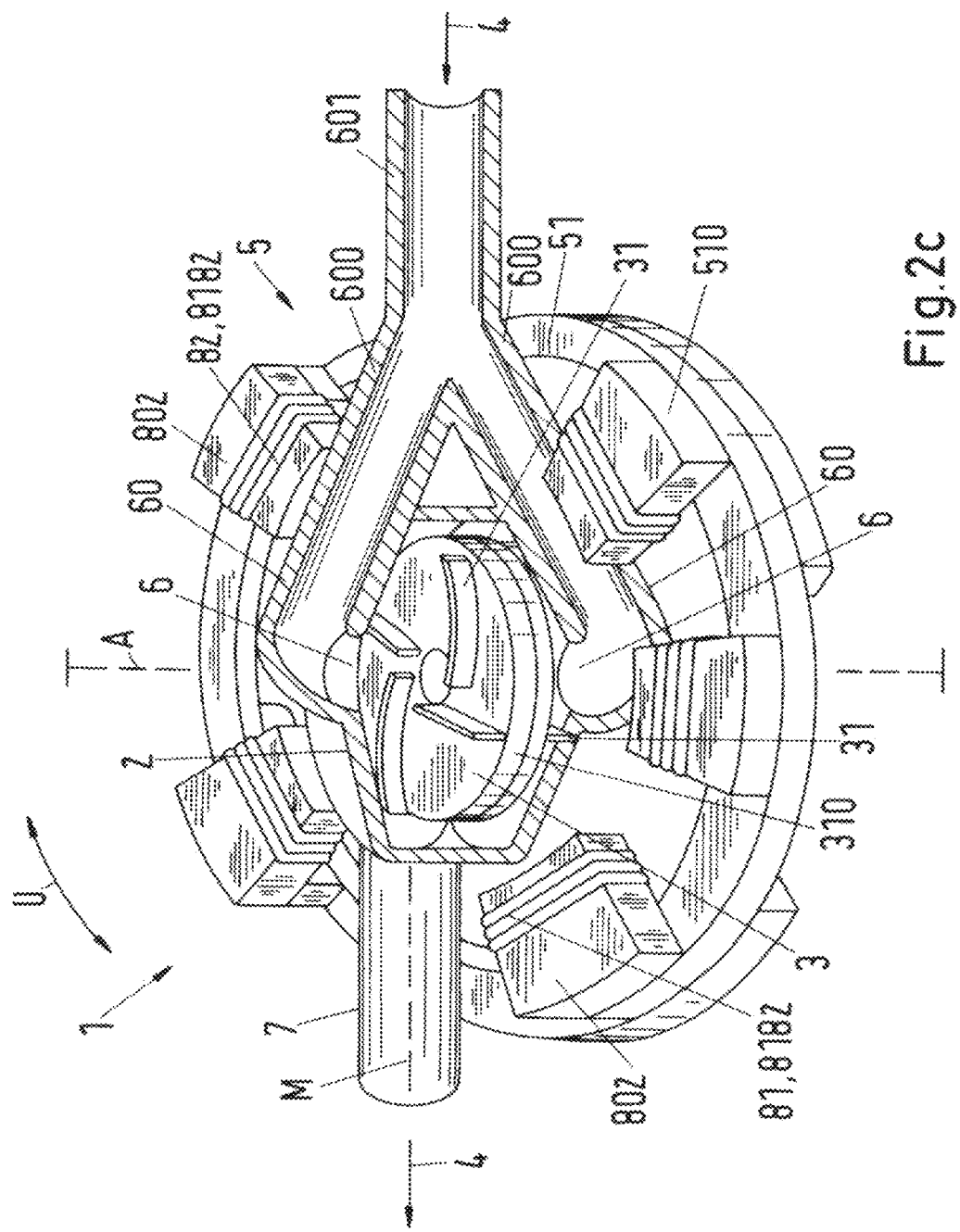
FIG. 2c illustrates an embodiment in accordance with FIG. 2b with asymmetrically arranged coil cores.
Figure 2D:
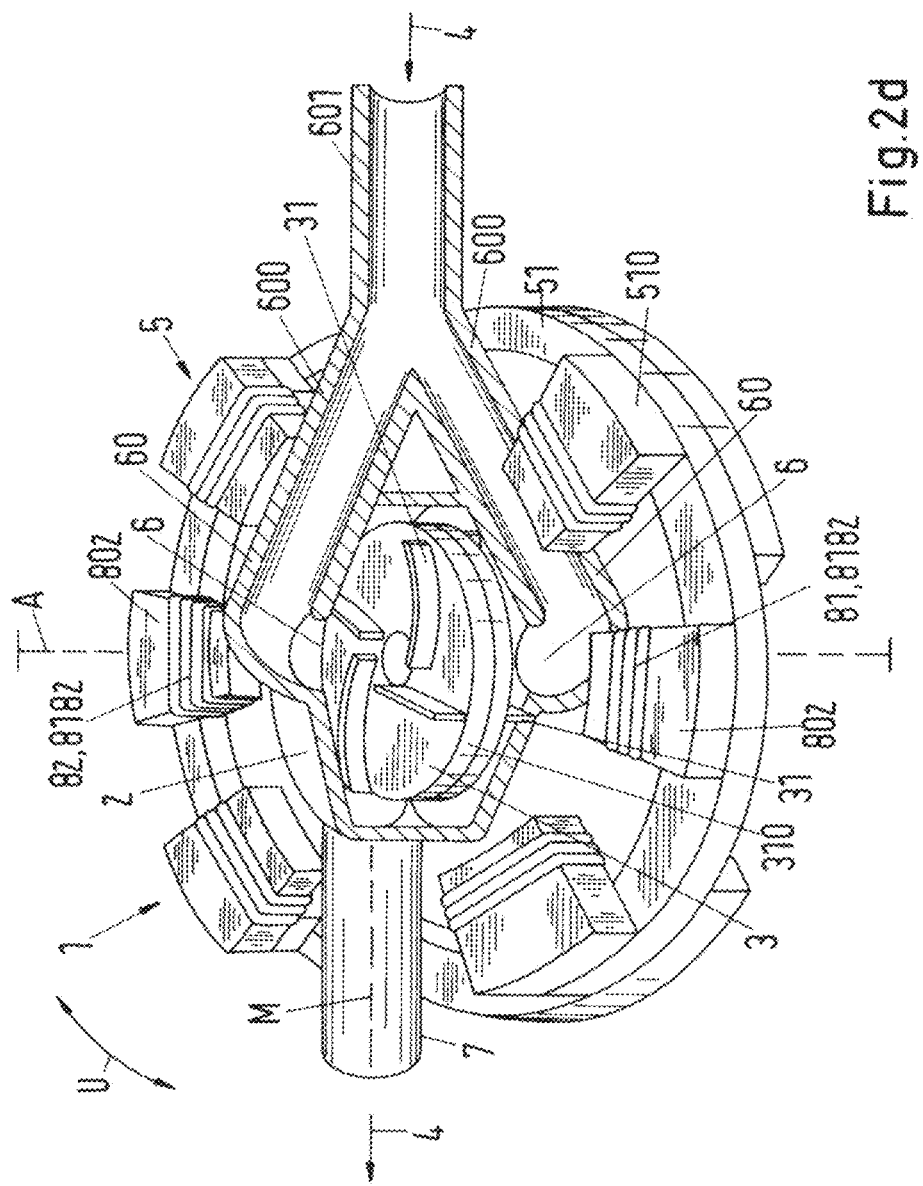
FIG. 2d illustrates an embodiment in accordance with FIG. 2b with symmetrically arranged coil cores.

FIG. 2*c* shows a first different embodiment in accordance with FIG. 2*b* having five asymmetrically arranged coil cores 802; FIG. 2*d* shows a second different embodiment in accordance with FIG. 2*b* having six symmetrically arranged coil cores 802.

In the now following embodiments, the drive 5 with stator 51 is not shown for reasons of clarity in FIG. 3*b* to FIG. 6*c*.

A further embodiment of a rotary pump 1 in accordance with the invention having a single axial inlet channel 61 is explained schematically with reference to FIG. 3*a* and FIG. 3*b* respectively which show, for illustration, a section along the line II-II in accordance with FIG. 3*a*. The embodiment of FIG. 3*a* and FIG. 3*b* respectively only differs from that of FIG. 1*a* and FIG. 1*b* respectively in that the feed of the fluid 4 into the pump housing 2 does not take place via the oppositely disposed inlet passages 60 which extend in the axial direction, but is rather effected via a single axial inlet passage 61.

For this purpose, an axially extending inlet passage 61 is provided centrally about the axis of rotation A which extends through the rotor 3 through a bore therein. Outlet openings 610 are provided at the axial inlet passage 61 at both sides with respect to the magnetic rotor plane 310 as can be seen particularly easily from FIG. 3*b* to act on the rotor 3 by the fluid 4 at both sides. In the specific embodiment of FIGS. 3*a* and 3*b* respectively, the rotor 3, as in all previously described Figures, an uncovered rotor, that is the rotor vanes 31, are not provided with their own cover. The function of a cover for the rotor vanes 31 is substantially taken over by the corresponding housing regions of the pump housing 2. It is therefore also sufficient in principle that in each case only one group of outlet openings 610 is provided at both sides of the rotor plane 310, in each case at the same spacing from the rotor plane 310.

FIG. 4 shows a different embodiment in accordance with FIG. 3*a* and FIG. 3*b* respectively having a covered rotor 3 with rotor cover 30. Unlike the embodiment in accordance with FIG. 3*a* and FIG. 3*b* respectively, outlet openings 610 are provided at different spacings from the magnetic rotor plane 310 at the axial inlet passage 61 at both sides with respect to the magnetic rotor plane 310 to act on the rotor 3 at both sides by the fluid 4. The outlet openings 610 in this respect have different sizes. The outlet openings 610 which have the greatest spacing from the magnetic rotor plane 310 have a smaller diameter than hose outlet openings 610 which are disposed closer to the magnetic rotor plane 310. This takes account of the geometry of the covered rotor 3, whereby more stable running properties of the rotor are made possible.

A central outlet opening 611 is moreover additionally provided at the inlet passage 61 at the level of the magnetic rotor plane 310 so that the rotor 3 can be acted on in the radial direction, both axially and radially symmetrically, by the fluid 4 in the region of the bore through which the inlet passage 61 is conducted through the rotor. An even further improved stabilization of the rotor 3 in the operating state is thereby in particular achieved. In addition, axial communication bores 310 for the fluid 4 are furthermore provided in the rotor 3, whereby the hydrodynamic behavior of the rotor 3 is further positively influenced in a manner known per se to the skilled person.

Figure 5C:
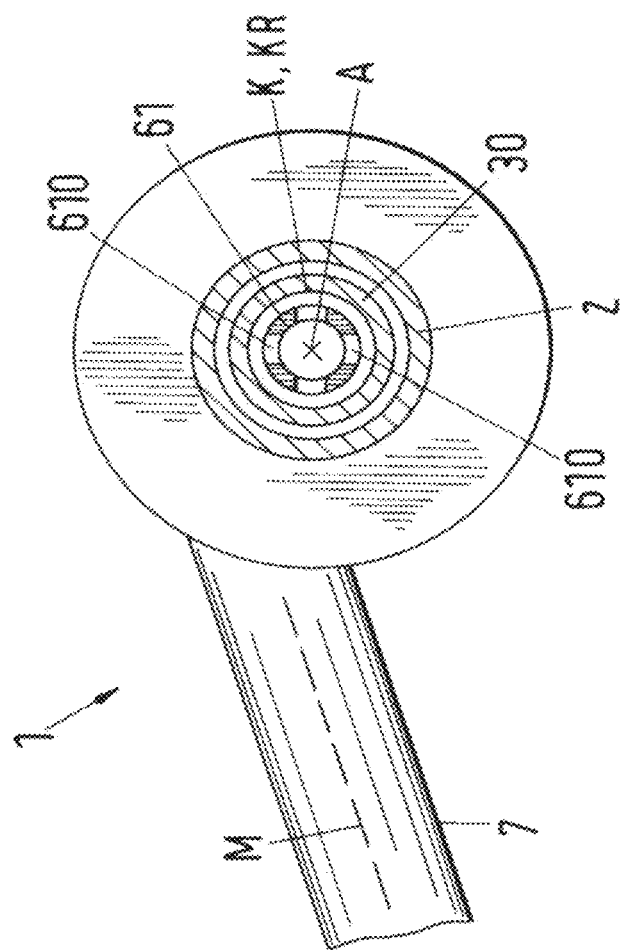

A further embodiment in accordance with FIG. 3*a* s shown schematically with reference to FIG. 5*a* having a covered rotor 3 with a rotor cover 30, wherein FIG. 5*b* shows a section along the line III-III and FIG. 5*c* a section along the line IV-IV i accordance with FIG. 5*a* for better understanding.

The embodiment in accordance with FIG. 5*a* to FIG. 5*c* differs from that of FIG. 4, on the one hand, in that the rotor 3 of FIG. 5*a* to FIG. 5*c* is a circular ring-shaped rotor 3, that is in principle a rotor 3 having a very large bore through which the inlet passage 61 extends. The rotor cover 30 of the rotor vanes 31 and the rotor vanes 31 themselves extend in this respect in the radial direction beyond the circular ring-shaped plate of the rotor 3 up to the vicinity of the inlet passage 61.

A further decisive difference to FIG. 4 lies in the fact that the covered rotor 3 has outwardly drawn collars K in the two axial directions, said collars each extending into a ring-shaped collar space KR. The two collars K in this respect cooperate with their associated collar space KR as a regulation valve. Depending on how far the rotor 3 deviates upwardly or downwardly from its axial equilibrium position, the bores 610 at the outside in the axial direction are covered correspondingly more or less by corresponding collars K. If the rotor 3 is e.g. displaced by a disturbance upwardly in accordance with the drawing in the axial direction out of its equilibrium position, the correspondingly axially outwardly disposed bore 610 is covered less, whereby the pressure in the rotary pump drops because the inlet pressure present over the bore 610 is naturally always smaller than the outlet pressure present at the outlet of the rotary pump. However, the outlet pressure is present above the cover of the rotor 3 so that the rotor 3 is pushed back into the axial equilibrium position again by the pressure difference. The collar K with the associated collar space KR thus acts as an automatic hydraulic regulation valve.

Since the part of the covered rotor 3 at the top in accordance with the drawing and the part of the covered rotor 3 at the bottom in accordance with the drawing are openly connected to on another between the rotor disk and the inlet passage 61, the outlet openings 610 arranged at both side at the axial inlet passage 61 with respect to the magnetic rotor plane 310 at different spacings from the magnetic rotor plane 310 each have the same size. The central outlet opening 611 additionally provided at the level of the magnetic rotor plane 310 moreover likewise has the same size as the remaining outlet openings 610 so that the covered rotor 3 can be acted on uniformly, that is with the same fluid throughflow, by the fluid 4 in the radial direction, both axially and radially symmetrically, via all outlet openings 610 and the central outlet opening 611. It is self-explanatory that with a circular rotor as a rule no axial communication bores 3100 for the fluid 4 have to be provided in the rotor 3.

FIG. 6a shows a fourth embodiment in accordance with FIG. 3a with a covered rotor and an asymmetrical outlet passage, wherein FIG. 6b shows a section along the line V-V in accordance with FIG. 6a and FIG. 6c shows a section along the line VI-VI in accordance with FIG. 6a in a schematic manner. As can in particular clearly be seen from FIG. 6b, no outlet opening 610 is provided at the inlet passage 61, but rather only a central outlet opening 611 with a greatly increased cross-section so that the covered circular ring-shaped rotor 3 can be acted on by fluid 4 at both sides of the rotor plane 310 through the central outlet opening 611 alone.

Due to the special geometry of the rotary pump 1 in accordance with FIGS. 6a to 6c, in particular due to the special embodiment of the outlet passage 7 whose cross-section lying in the magnetic rotor plane 310 extends away from the pump housing 2 while expanding, an elevated pressure can preferably be generated at the pump housing 2 due to the narrow cross-section of the outlet passage 7 which has, as a rule, however, simultaneously to be obtained at the cost of a reduced conveying rate of the rotary pump 1.

The covered rotors 3 in accordance with FIG. 4 to FIG. 6c furthermore have, as already presented in the description of FIG. 5a, the advantage that the rotor 3 is automatically hydraulically stabilized to a special degree against an axial displacement, for example due to a pressure fluctuation in the fluid 4 or as a consequence of a pressure action on the rotor 3 by the fluid 4 which is asymmetric with respect to the magnetic rotor plane 310.

If one looks, for example as a representative, at the rotary pump 1 in accordance with FIG. 5a or FIG. 6b, it can easily be recognized that when the rotor 3 is asymmetrically displaced, for example, in one of the two axial directions, for example upwardly in accordance with the drawing, a corresponding overpressure is formed upwardly between the pump housing 2 and the rotor cover 30 of the rotor 3, said overpressure forcing the rotor 3 back downwardly again in the direction of the equilibrium position in which the magnetic rotor plane 31 and the magnetic stator plane 510 coincide. In addition, on a displacement of the rotor 3 from its equilibrium position, the rotor 3 is acted on by fluid 4 asymmetrically with respect to the axial direction via the outlet openings 610 or via the central outlet opening 611, which likewise has the result that a corresponding restoring force is thereby produced which again attempts to move the rotor 3 back into the equilibrium position.

In this respect, the regulation effect in the embodiment of FIG. 6a or 6bn respectively is much more pronounced than in those of FIG. 5. A respective outwardly drawn collar K is also provided at the covered rotor 3 in both axial directions in the example of FIG. 6, said collar in each case reaching into a ring-shaped collar space KR. In contrast to the example of FIG. 5, however, it is here the case that a respective ring-shaped spacing wreath Z is provided inwardly at the rotor housing 2 so that the maximum axial deflection of the rotor 3 is limited by the spacing wreath Z such that a control space SR is even formed between the cover of the rotor 3 and the rotor housing 2 at the maximum possible axial deflection of the rotor 3. In addition, only one central outlet opening 611 is provided at the central inlet passage 61 and can be configured, for example, as circular or also differently, as inter alia shown also as oval. Unlike FIG. 5, the interior of the rotor 3 is thus always acted on by the inlet pressure uniformly via the central outlet opening 611.

If the rotor 3 is displaced e.g. upwardly in accordance with the illustration by a disturbance out of its equilibrium position, the inlet pressure which is applied at t the outlet opening is substantially blocked by the upper control space SR due to the cooperation of the upper collar K with the upper collar space KR so that substantially the higher outlet pressure is applied in the upper control space SR at the cover of the rotor 3, whereby the rotor 3 is automatically displaced downwardly in accordance with the drawing.

In the converse case, when the rotor 3 is deflected downwardly in the axial direction in accordance with the drawing, substantially only the higher outlet pressure acts in the lower control space SR, while a specific mean pressure is applied in the upper control space SR formed from the inlet pressure and the outlet pressure so that the rotor 3 is also again automatically pushed back into its axial equilibrium position in this case.

As the skilled person recognizes without problem, in particular the covered rotors 3 thus form a hydraulic proportional controller (P controller) in interaction with the pump housing 2, said proportional controller automatically hydraulically stabilizing the axil equilibrium position of the rotor 3.

FIG. 7 to FIG. 11b show further embodiments of rotary pumps 1 in accordance with the invention which, in accordance with FIG. 6a to FIG. 6c, have an outlet passage 7 whose cross-section lying in the magnetic rotor plane 310 extends away from the pump housing 2 in a widening manner. The aforesaid Figures in particular illustrate different stator arrangements with which rotary pumps 1 can be realized particularly advantageously with an asymmetrical outlet passage 7.

FIG. 7 shows such an embodiment of a rotary pump 1 in accordance with the invention having an inner coiling core 803 within the stator 51. The stator 51 itself is in this respect configured in the region of the gap L through which the outlet passage 7 extends such that the gap L is kept as small as possible. Since the stator 51 has inner bar-shaped coil cores 803, the stator 51 is a ferromagnetic stator 51.

In this respect, it is self-explanatory that the stator 51, additionally or alternatively, can also have inner E-shaped coil cores 801. When the stator 51 only has inner E-shaped coil cores 801, for example, the stator 51 naturally does not absolutely need to be ferromagnetic, but can rather, for example, be made from another material, for example from plastic.

A symmetry of the magnetic flux or of the reflux of the magnetic flux in the ferromagnetic stator 51 is thus considerably disturbed by the gap L. To balance this, the inner coil cores 803 have different sizes and are distributed slightly asymmetrically over the peripheral direction U of the stator 51 so that overall a magnetic flux is adopted or a magnetic reflux is established over the ferromagnetic rotor 51 such that the rotor 3 is reliably journalled in the stator 51 in the operating state and can be driven securely.

Another embodiment having a stator tooth 804 extending toward the rotor 3 is shown in FIG. 8. The stator teeth 804 directly adjacent the asymmetrical outlet passage 7 are in this respect geometrically arranged and configured so that they are matched to the asymmetrical shape of the outlet passage 7 in as optimum a manner as possible and the size of the gap L is minimized as much as possible. Since, as the skilled person immediately recognizes, the stator 51 also has to be a ferromagnetic stator 51 here via which the magnetic reflux takes place, the magnetic asymmetry also occurring here analog to the example of FIG. 7 is compensated in that the stator teeth 804 have different sizes and are configured suitably asymmetrically and are arranged in a suitable manner over the periphery U of the stator 51.

Due to the relatively large gap which is here not closed by a ferromagnetic material, the stator 51 has to have a sufficient width since, to close the magnetic flux, said magnetic flux has to be conducted over the total periphery of the stator 51. The width of the stator 51 is in this respect preferably approximately the same as or larger than the width of the stator teeth.

A second embodiment in accordance with FIG. 8 is shown schematically in FIG. 9*a* having a housing shell 21 for the pump housing. 2. FIG. 9*b* in this respect shows a section along the line VII-VII in accordance with FIG. 9*a* for better understanding. The axial position regulation in this respect takes place in a completely analog manner as already described in detail in FIG. 6*b*.

The air gap between the stator 51 and the rotor 3 must very frequently be as thin as possible, that is the spacing between the stator 51 or stator tooth 804 and the rotor 3 should frequently be as small as possible. Since, however, the pump housing 2 is located between the rotor 3 and the stator 51 or stator tooth 804, a wall thickness of the pump housing 2 must be as small as possible at least in the region of the stator 51 or of the stator tooth 804. This naturally results in a corresponding mechanical weakening of the pump housing 2, which is in particular of relevance when a relatively high pressure is produced by the rotary pump 1 as, for example, in the rotary pump 1 in accordance with FIG. 9*a* or FIG. 9*b* in which the wall thickness of the pump housing is, for example, only 1 mm to 1.5 mm.

In such a case, a housing shell 21 arranged around the pump housing 2 can particularly advantageously additionally be provided for the mechanical strengthening of the pump housing 2. As can be seen particularly clearly from FIG. 9*b*, the housing shell 21 has a cut-out 211 in the region of the stator teeth 804 in which the stator tooth 804 is provided so that the stator tooth 804 reaches directly up to the thin pump housing 2, whereby the spacing between the stator tooth 804 and the rotor 3 is minimized. The housing shell 21 in accordance with FIG. 9*b* is particularly preferably configured in two parts, wherein the two parts can, for example, be reliably connected to one another via screws 210.

FIG. 10*a* shows another embodiment in accordance with FIG. 8 with an iron ring 53 as a magnetic gap closure. Since the coil cores 800 are bar-shaped stator teeth 804, the reflux of the magnetic flux has to take place over the ferromagnetic stator 51 which is made of iron here. In order, on the one hand, to improve the mechanical stability of the stator 51, but above all to ensure a magnetic reflux for the magnetic flux over the stator 51 which is as reliable as possible, a ferromagnetic ring-shaped closure element 53, here an iron ring element 53, is provided at the gap L.

The magnetic reflux is thereby, on the one hand, ensured over the stator 51 and, on the other hand, the gap L is created so that the outlet passage 7 in the region of the stator 51 is conducted radially outwardly away from the pump housing 2 such that the center axis M of the radial outlet passage 7 coincides with the magnetic rotor plane 310 or with the magnetic stator plane 510.

Since the gap L is here closed by a ferromagnetic material, the stator 51 can, in contrast to the example of FIG. 7 to FIG. 9, have a considerably reduced width since, for the closing of the magnetic flux, it does not have to be conducted over the total periphery of the stator 51, but can rather be closed between adjacent coil cores. The width of the stator 51 is in this respect in practice preferably selected approximately the same as or smaller than half the width of the stator teeth.

FIG. 11*a* finally shows a further embodiment in accordance with FIG. 8 having geometrically differently configured coil cores, wherein FIG. 11*b* shows a section along the line IX-IX in accordance with FIG. 11*a*. A particular advantage of the embodiment in accordance with FIG. 11*a* or FIG. 11*b* is in this respect its modular structure. The four individual segments S shown can each be removed or replaced individually outwardly in the radial direction from the rotor housing 2, whereby in particular a servicing or repair of the rotary pump 1 is very simplified and made less expensive.

In the specific example in accordance with FIG. 11, in this respect each segment S bears three coils, wherein in practice the middle coil core of each segment S frequently preferably bears the bearing winding 82 and the two outer coil cores preferably each bear one drive coil 81.

As can in particular be seen from FIG. 11*b*, the arrangement in accordance with FIG. 11*a* is particularly suitable when the pump housing 2 has to withstand a relatively high pressure, that is has to have a very stable mechanical configuration, but no additional housing shell 21 for the pump housing 2 can be provided for specific reasons, for example for space reasons, for weight reasons or simply to keep the design of the rotary pump 1 as simple as possible.

In such a case, the pump housing 2 must at least to a very large extent have a sufficiently large wall thickness to withstand the hydraulic pressure, wherein simultaneously the spacing between the stator teeth 804 and the rotor 3 has to be kept as small as possible.

These two conditions which initially appear to preclude one another can be realized in that the stator 51, as shown in FIG. 11*a*, is configured as a multipart stator 51 having a plurality of stator segments 511. The wall thickness of the pump housing 2 can then very largely be kept sufficiently thick, in particular in the region between the stator segments 511. As clearly shown in FIG. 11*b*, the wall thickness of the pump housing 2 is only substantially reduced in the region between the stator teeth 804 and the rotor 3 so much that a reliable journalling and a reliable drive of the rotor 3 is ensured.

The asymmetry in the magnetic reflux which thereby arises in the stator 51 is compensated in that the stator teeth 804 and/or the coil windings 81, 82 at least partly have different sizes and/or shapes and are arranged in a suitable manner over the peripheral direction U of the stator. In addition, the pole shoes 8041 of the stator teeth 804 are configured correspondingly differently, whereby magnetic asymmetries in the stator 51 can likewise be compensated.

It is understood that all the above-described embodiments of the invention are only to be understood as examples or by way of example and that the invention in particular, but not only, includes all suitable combinations of the described embodiments.

The invention claimed is:

1. A rotary pump, including a magnetic rotor arranged in a pump housing and having a magnetic rotor plane, which rotor is operatively connected to a drive for conveying a fluid, wherein an inlet opening is provided at the pump housing for the inlet of the fluid into the pump housing and a radial outlet passage is provided for conveying the fluid out of the pump housing and wherein the drive is a bearingless motor having a stator configured as a bearing stator and drive stator and having a magnetic stator plane, at which stator a plurality of coil cores is provided with each coil core bearing a drive coil or a bearing coil and/or a drive bearing coil with each coil lying in the magnetic stator plane, wherein the rotor is magnetically contactlessly journalled within the stator and an axial height of the rotor is smaller than or equal to half a diameter of the rotor so that the rotor is passively magnetically stabilized by reluctance forces with respect to the magnetic stator plane both against an axial displacement and against a tiling from an equilibrium position, wherein the radial outlet passage is radially outwardly conducted away from the pump housing in a region of the stator such that a center axis of the radial outlet passage coincides with the magnetic rotor plane or with the magnetic stator plane, and wherein each coil core is provided in the form of an E-shaped coil core so that a reflux of a magnetic flux can take place via limbs of the respective E-shaped coil core.

2. A rotary pump in accordance with claim 1, wherein the stator has a gap in the peripheral direction in which the radial outlet passage is arranged.

3. A rotary pump in accordance with claim 1, wherein the stator is made from plastic and carrying all coil cores.

4. A rotary pump in accordance with claim 1, wherein each coil core has a middle limb at which the drive coil and/or the bearing coil and/or the drive bearing coil is provided.

5. A rotary pump in accordance with claim 1, wherein each coil core is provided in the form of an inner coil core within the stator.

6. A rotary pump in accordance with claim 1, wherein two coil cores are geometrically differently configured at one and the same stator.

7. A rotary pump in accordance with claim 1, wherein the rotor is acted on by the fluid flowing into the pump housing at both sides with respect to an axis of rotation; and/or wherein two inlet passages disposed opposite with respect to the magnetic rotor plane are provided.

8. A rotary pump in accordance with claim 7, wherein an axially extending inlet passage is provided which is arranged centrally about the axis of rotation and which extends through the rotor.

9. A rotary pump in accordance with claim 8, wherein outlet openings for acting on the rotor by the fluid at both sides are provided at both sides with respect to the magnetic rotor plane at the axial inlet passage.

* * * * *